US011356946B2

(12) United States Patent
Sarkis et al.

(10) Patent No.: US 11,356,946 B2
(45) Date of Patent: Jun. 7, 2022

(54) MULTI-USER WAKE-UP SIGNAL

(71) Applicant: QUALCOMM Incorporated, San Diego, CA (US)

(72) Inventors: Gabi Sarkis, San Diego, CA (US); Peter Pui Lok Ang, San Diego, CA (US); Wooseok Nam, San Diego, CA (US); Hung Dinh Ly, San Diego, CA (US); Wanshi Chen, San Diego, CA (US); Olufunmilola Omolade Awoniyi-Oteri, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 16/860,871

(22) Filed: Apr. 28, 2020

(65) Prior Publication Data
US 2020/0351776 A1 Nov. 5, 2020

Related U.S. Application Data

(60) Provisional application No. 62/892,459, filed on Aug. 27, 2019, provisional application No. 62/842,421, filed on May 2, 2019.

(51) Int. Cl.
*G08C 17/00* (2006.01)
*H04W 52/02* (2009.01)
*H04W 88/02* (2009.01)

(52) U.S. Cl.
CPC ........ *H04W 52/0219* (2013.01); *H04W 88/02* (2013.01)

(58) Field of Classification Search
CPC ............ H04W 52/0219; H04W 88/02; H04W 68/025; H04W 52/0235; H04W 8/186; Y02D 30/70
(Continued)

(56) References Cited

U.S. PATENT DOCUMENTS 8,139,945 B1 * 3/2012 Amir .................. H04W 4/80
398/126
9,204,388 B2 * 12/2015 Qi ...................... H04W 52/0216
(Continued)

OTHER PUBLICATIONS

CMCC: "Discussion on Power Saving Signal Triggering UE Adaptation", 3GPP Draft, 3GPP TSG RAN WG1 #96bis, R1-1904738, 3rd Generation Partnership Project (3GPP), Mobile Competence Centre, 650, Route Des Lucioles, F-06921, Sophia-Antipolis Cedex, France, vol. RAN WG1. No. Xi 'an. China; Apr. 8, 2019-Apr. 12, 2019, Apr. 2, 2019 (Apr. 2, 2019), XP051707299, 7 pages, Retrieved from the Internet: URL: http://www.3gpp.org/ftp/tsg%5Fran/WG1% 5FRL1/TSGR1%5F96b/Docs/R1%2D1904738%2Ezip [retrieved on Apr. 2, 2019], paragraph [02.2], figures 1. 2.
(Continued)

*Primary Examiner* — Mahendra R Patel
(74) *Attorney, Agent, or Firm* — Harrity & Harrity, LLP

(57) ABSTRACT

Various aspects of the present disclosure generally relate to wireless communication. In some aspects, a user equipment may receive a multi-UE wake-up signal in a downlink control information (DCI) communication. The DCI communication may include a set of content field groups. The UE may identify a content field group of the set of content field groups that is to be read by the UE, and determine a behavior associated with performing a UE wake-up operation based at least in part on the identified content field group. Numerous other aspects are provided.

28 Claims, 11 Drawing Sheets

(58) Field of Classification Search
USPC .................................. 370/311, 329; 455/574
See application file for complete search history.

(56) References Cited

U.S. PATENT DOCUMENTS

| | | | | |
|---|---|---|---|---|
| 2005/0064818 | A1* | 3/2005 | Assarsson | H04W 74/006 455/41.2 |
| 2010/0317374 | A1* | 12/2010 | Alpert | H04W 68/02 455/458 |
| 2010/0317734 | A1* | 12/2010 | Folan | A61P 17/00 514/558 |
| 2012/0275364 | A1* | 11/2012 | Anderson | H04W 52/0222 370/311 |
| 2015/0189574 | A1* | 7/2015 | Ng | H04W 24/08 370/252 |
| 2016/0127918 | A1* | 5/2016 | Yi | H04W 16/26 370/329 |
| 2016/0381704 | A1* | 12/2016 | Chu | H04W 52/0216 370/329 |
| 2017/0011875 | A1* | 1/2017 | Dorn | H01H 9/542 |
| 2017/0055290 | A1* | 2/2017 | Lv | H04L 5/0053 |
| 2017/0272999 | A1* | 9/2017 | Tsai | H04W 52/0274 |
| 2017/0339677 | A1* | 11/2017 | Rico Alvarino | H04W 16/02 |
| 2018/0270756 | A1* | 9/2018 | Bhattad | H04W 76/27 |
| 2019/0028967 | A1* | 1/2019 | Ahn | H04B 7/02 |
| 2019/0069231 | A1* | 2/2019 | Kneckt | H04W 28/065 |
| 2019/0090193 | A1* | 3/2019 | Liu | H04W 52/0229 |
| 2019/0098574 | A1* | 3/2019 | Huang | H04W 52/0219 |
| 2019/0124596 | A1* | 4/2019 | Cao | H04L 5/0053 |
| 2019/0261273 | A1* | 8/2019 | Kim | H04W 52/0229 |
| 2019/0373549 | A1* | 12/2019 | Amin | H04W 52/0248 |
| 2020/0015166 | A1* | 1/2020 | Ahn | H04W 52/0235 |
| 2020/0213063 | A1* | 7/2020 | Lin | H04L 1/0026 |
| 2020/0367194 | A1* | 11/2020 | Berggren | H04W 52/0216 |
| 2020/0383119 | A1* | 12/2020 | Sun | H04L 5/0092 |
| 2021/0014791 | A1* | 1/2021 | Freda | H04W 52/0229 |
| 2021/0050982 | A1* | 2/2021 | Lin | H04B 7/0626 |

OTHER PUBLICATIONS

LG Electronics: "Discussion on Power Saving Signal/channel in MTC", 3GPP Draft, 3GPP TSG RAN WG1 Meeting 90bis, R1-1717279, 3rd Generation Partnership Project (3GPP), Mobile Competence Centre, 650, Route Des Lucioles, F-06921, Sophia-Antipolis Cedex, France, vol. RAN WG1. No. Prague. CZ; Oct. 9, 2017-Oct. 13, 2017, Oct. 8, 2017 (Oct. 8, 2017), XP051340469, 12 pages, Retrieved from the Internet: URL: http://www.3gpp.org/ftp/Meetings_3GPP_SYNC/RAN1/Docs/ [retrieved on Oct. 8, 2017], paragraphs [2.1.3]. [2.1.4], paragraph [0004], figure 2.
Partial International Search Report—PCT/US2020/030502—ISA/EPO—dated Jul. 16, 2020.
International Search Report and Written Opinion—PCT/US2020/030502—ISAEPO—dated Sep. 8, 2020.

* cited by examiner

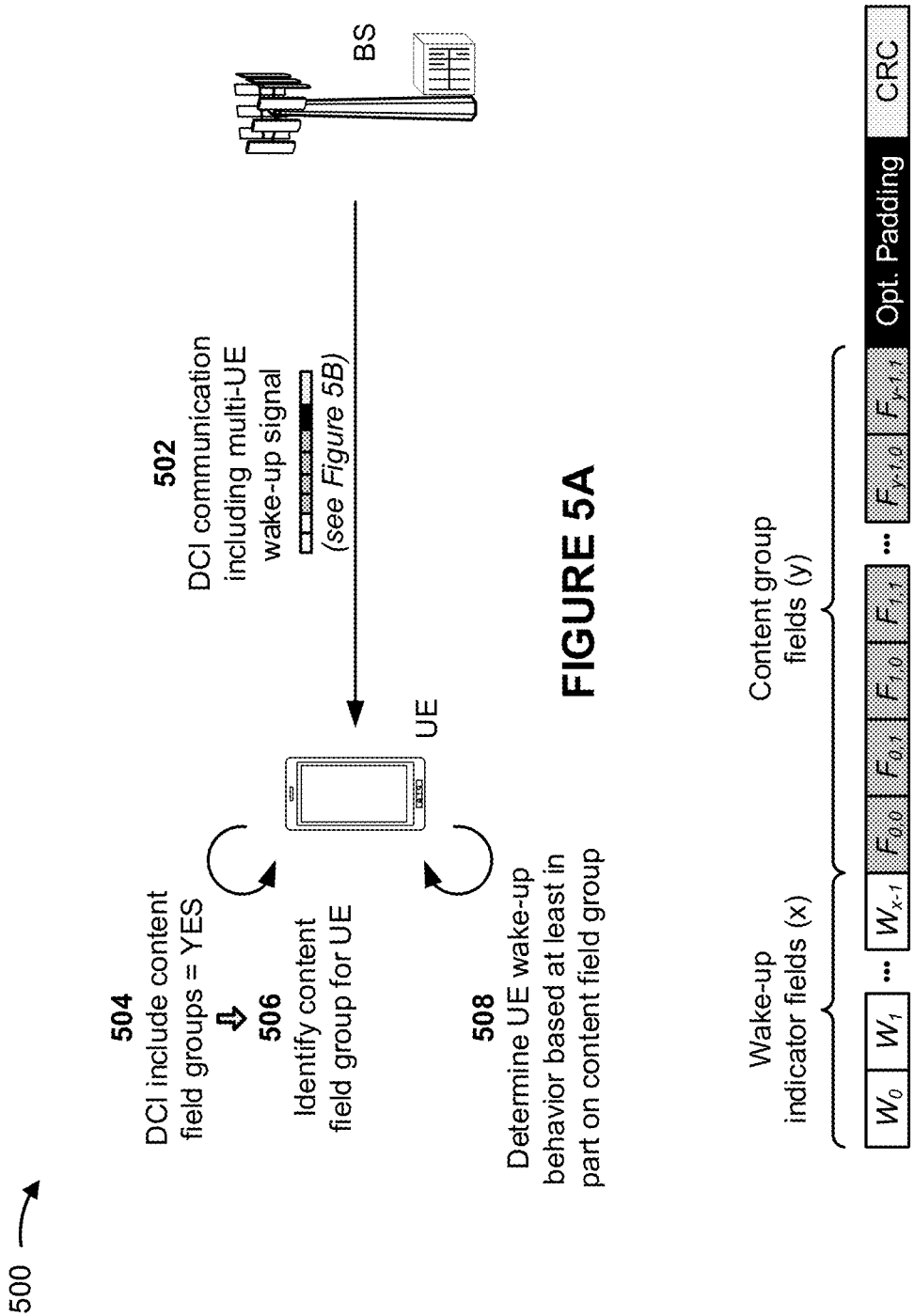

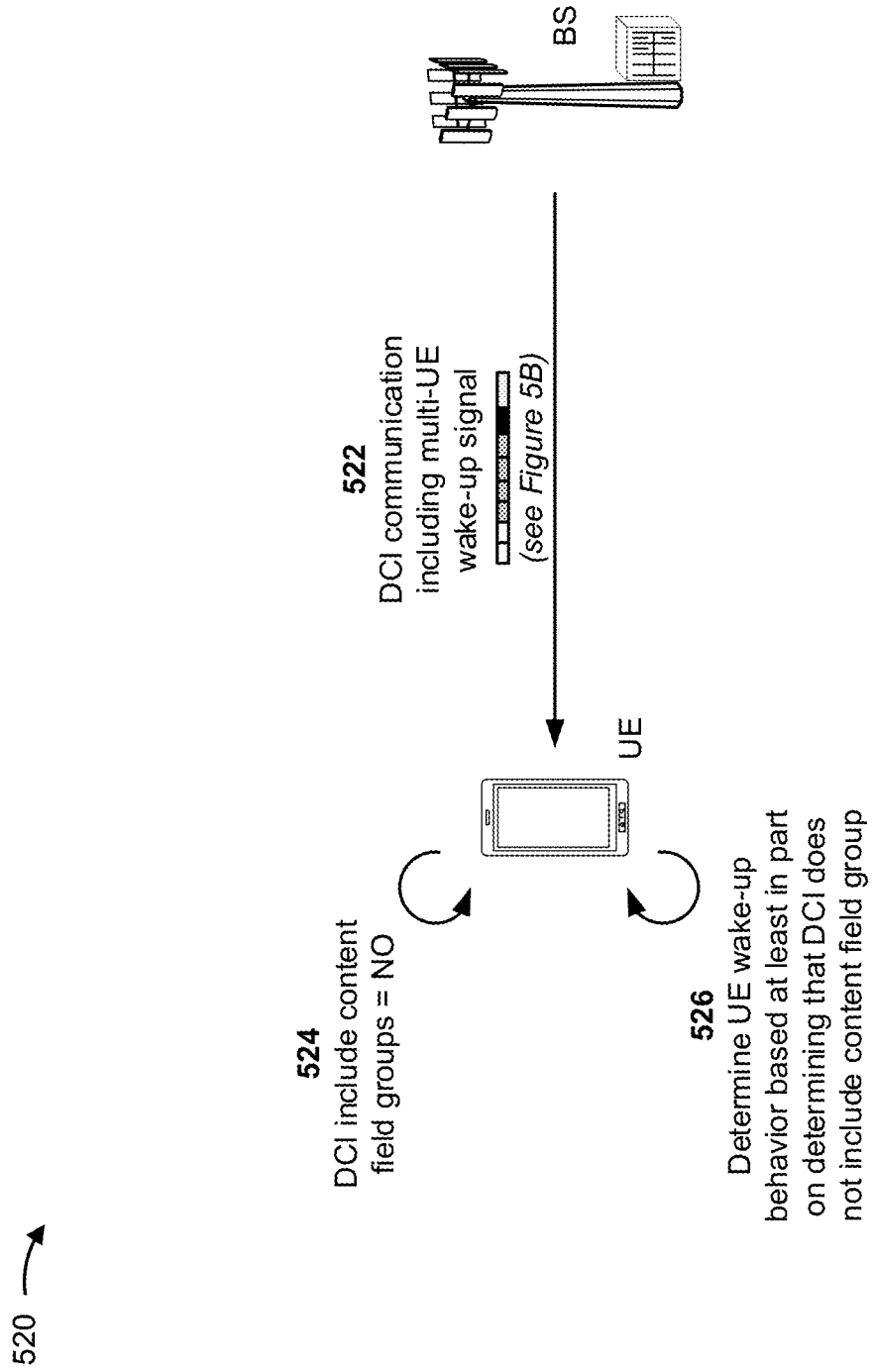

MULTI-USER WAKE-UP SIGNAL

CROSS-REFERENCE TO RELATED APPLICATION

This patent application claims priority to U.S. Provisional Patent Application No. 62/842,421, filed on May 2, 2019, entitled "MULTI USER EQUIPMENT WAKE-UP SIGNAL," and assigned to the assignee hereof. This patent application claims priority to U.S. Provisional Patent Application No. 62/892,459, filed on Aug. 27, 2019, entitled "MULTI USER EQUIPMENT WAKE-UP SIGNAL," and assigned to the assignee hereof. The disclosures of the prior applications are considered part of and are incorporated by reference in this patent application.

FIELD OF THE DISCLOSURE

Aspects of the present disclosure generally relate to wireless communication, and more specifically to techniques and apparatuses for multiple user equipment (multi-UE) wake-up signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A wake-up signal may be used to indicate to the UE whether it should expect to receive or transmit communications in an upcoming discontinuous reception (DRX) cycle on-duration. The wake-up signal can be a downlink control information (DCI) communication transmitted on a physical downlink control channel (PDCCH). In some cases, the wake-up signal may include additional information associated with a behavior of the UE when performing a wake-up, such as information that identifies a bandwidth part (BWP) to use upon wake-up, a request to provide a channel state information (CSI) report, information that identifies a set of resources in which to transmit the CSI report, or the like. The wake-up signal can be used to target multiple UEs. While multiple UE (multi-UE) wake-up signals are efficient in that multiple UEs can be woken up with a single wake-up signal, conveying information associated with wake-up behaviors of the UEs is problematic. For example, as the quantity of UEs to be awakened by a multi-UE wake-up signal increases, an amount of information and therefore a size of the DCI communication needs to increase. Further, in a case when additional information is conveyed in the DCI communication, a given UE must be capable of identifying a portion of the DCI communication that carries information for the given UE. In a case when the DCI communication does not include additional information (in other words, no additional information beyond a multi-UE wake-up signal), or when a size of the DCI communication does not permit the additional information to be fully provided to the multiple UEs, a given UE is required to determine a behavior associated with performing a UE wake-up in another manner and/or based at least in part on partial information.

SUMMARY

In some aspects, a method of wireless communication, performed by a user equipment (UE), may include receiving a multiple UE (multi-UE) wake-up signal in a downlink control information (DCI) communication, the DCI communication including a set of content field groups; identifying a content field group of the set of content field groups that is to be read by the UE; and determining, based at least in part on the identified content field group, a behavior associated with performing a UE wake-up operation.

In some aspects, a UE for wireless communication may include memory and one or more processors operatively coupled to the memory. The memory and the one or more processors may be configured to receive a multi-UE wake-up signal in a DCI communication, the DCI communication including a set of content field groups; identify a content field group of the set of content field groups that is to be read by the UE; and determine, based at least in part on the identified content field group, a behavior associated with performing a UE wake-up operation.

In some aspects, a non-transitory computer-readable medium may store one or more instructions for wireless communication. The one or more instructions, when executed by one or more processors of a UE, may cause the one or more processors to: receive a multi-UE wake-up signal in a DCI communication, the DCI communication including a set of content field groups; identify a content field group of the set of content field groups that is to be read by the UE; and determine, based at least in part on the identified content field group, a behavior associated with performing a UE wake-up operation.

In some aspects, an apparatus for wireless communication may include means for receiving a multi-UE wake-up signal in a DCI communication, the DCI communication including a set of content field groups; means for identifying a content field group of the set of content field groups that is to be read by the apparatus; and means for determining, based at least in part on the identified content field group, a behavior associated with performing a UE wake-up operation.

In some aspects, a method of wireless communication, performed by a UE, may include receiving a multi-UE wake-up signal in a DCI communication; determining that the DCI communication does not include a content field group; and determining, based at least in part on determining that the DCI does not include a content field group, a behavior associated with performing a UE wake-up operation.

In some aspects, a UE for wireless communication may include memory and one or more processors operatively coupled to the memory. The memory and the one or more processors may be configured to receive a multi-UE wake-up signal in a DCI communication; determine that the DCI communication does not include a content field group; and determine, based at least in part on determining that the DCI does not include a content field group, a behavior associated with performing a UE wake-up operation.

In some aspects, a non-transitory computer-readable medium may store one or more instructions for wireless communication. The one or more instructions, when executed by one or more processors of a UE, may cause the one or more processors to: receive a multi-UE wake-up signal in a DCI communication; determine that the DCI communication does not include a content field group; and determine, based at least in part on determining that the DCI does not include a content field group, a behavior associated with performing a UE wake-up operation.

In some aspects, an apparatus for wireless communication may include means for receiving a multi-UE wake-up signal in a DCI communication; means for determining that the DCI communication does not include a content field group; and means for determining, based at least in part on determining that the DCI does not include a content field group, a behavior associated with performing a UE wake-up operation.

In some aspects, a method of wireless communication, performed by a UE, may include receiving a multi-UE wake-up signal in a DCI communication; determining that a quantity of multi-UE wake-up signals included in the DCI communication is set to a special value or is greater than a quantity of content field groups included in the DCI communication; and determining a behavior associated with performing a UE wake-up operation based at least in part on determining that the quantity of multi-UE wake-up signals is set to the special value or is greater than the quantity of content field groups.

In some aspects, a UE for wireless communication may include memory and one or more processors operatively coupled to the memory. The memory and the one or more processors may be configured to receive a multi-UE wake-up signal in a DCI communication; determine that a quantity of multi-UE wake-up signals included in the DCI communication is set to a special value or is greater than a quantity of content field groups included in the DCI communication; and determine a behavior associated with performing a UE wake-up operation based at least in part on determining that the quantity of multi-UE wake-up signals is set to the special value or is greater than the quantity of content field groups.

In some aspects, a non-transitory computer-readable medium may store one or more instructions for wireless communication. The one or more instructions, when executed by one or more processors of a UE, may cause the one or more processors to: receive a multi-UE wake-up signal in a DCI communication; determine that a quantity of multi-UE wake-up signals included in the DCI communication is set to a special value or is greater than a quantity of content field groups included in the DCI communication; and determine a behavior associated with performing a UE wake-up operation based at least in part on determining that the quantity of multi-UE wake-up signals is set to the special value or is greater than the quantity of content field groups.

In some aspects, an apparatus for wireless communication may include means for receiving a multi-UE wake-up signal in a DCI communication; means for determining that a quantity of multi-UE wake-up signals included in the DCI communication is set to a special value or is greater than a quantity of content field groups included in the DCI communication; and means for determining a behavior associated with performing a UE wake-up operation based at least in part on determining that the quantity of multi-UE wake-up signals is set to the special value or is greater than the quantity of content field groups.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 5A-5D are diagrams illustrating various examples associated with multi-UE wake-up signaling in accordance with various aspects of the present disclosure.

DETAILED DESCRIPTION

Figure 1:
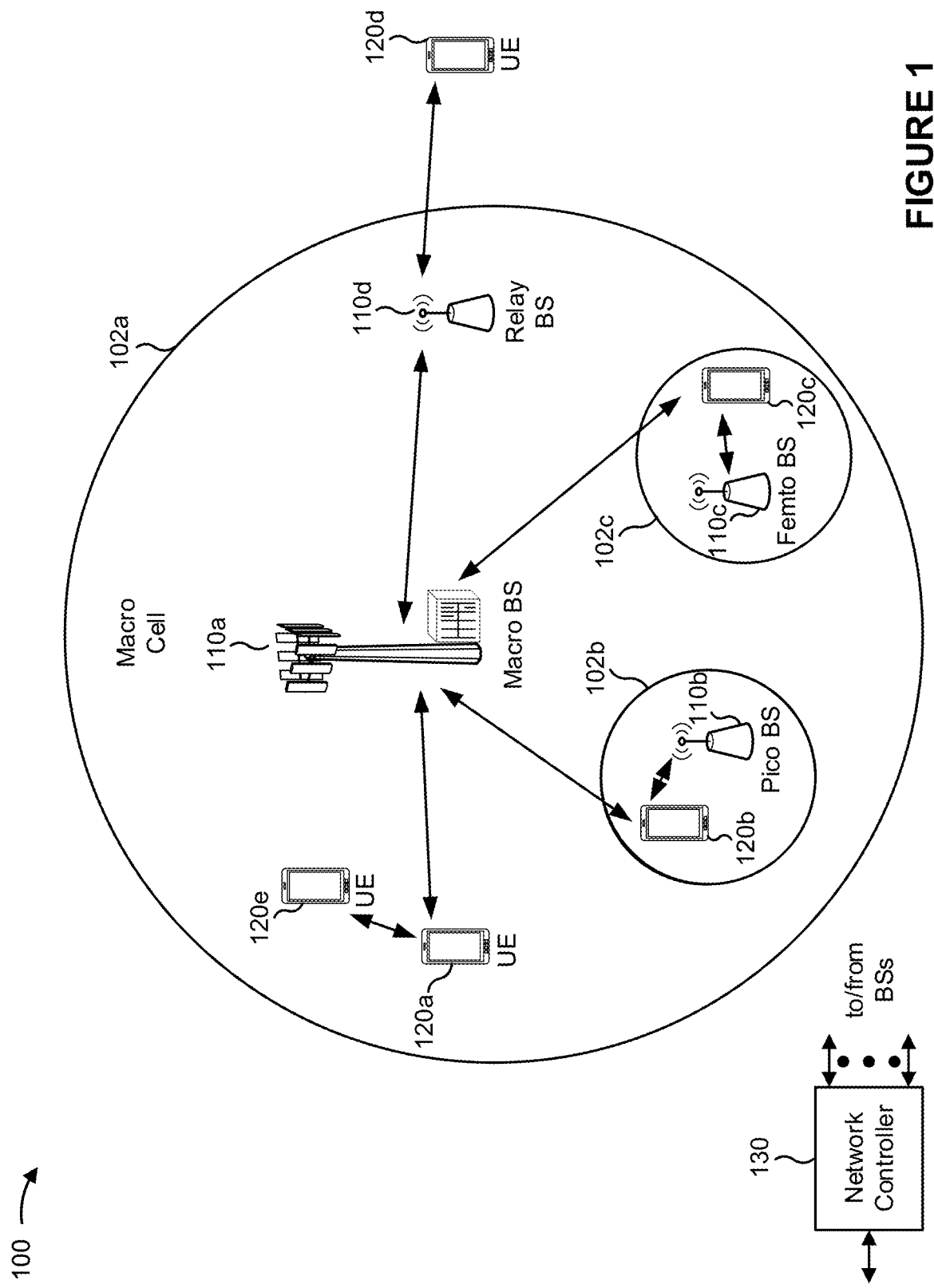
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G or 4G wireless technologies, aspects of the present disclosure can be applied in other generation-based communication systems, such as 5G and later, including NR technologies.

In a wireless communication network, a UE may be configured with a discontinuous reception (DRX) cycle in order to improve a battery lifetime of a UE. The DRX cycle includes an "on duration" (also referred to as "active time") during which the UE should monitor a physical downlink control channel (PDCCH), and a "DRX period" during which the UE can skip reception of downlink channels, thereby conserving battery power. A wake-up signal may be used to indicate to the UE whether it should expect to receive or transmit communications in an upcoming DRX on duration. Upon receiving a wake-up signal, the UE may resume monitoring and reception of one or more downlink channels in association with receiving or transmitting a communication during the DRX on duration. Conversely, if no wake-up signal is received, the UE may continue skipping reception of downlink channels.

The wake-up signal can be a downlink control information (DCI) communication transmitted on the PDCCH. In some cases, the wake-up signal may include additional information associated with a behavior of the UE when performing a wake-up. Such additional information can include, for example, information that identifies a bandwidth part (BWP) to use upon wake-up, a request to provide a channel state information (CSI) report, information that identifies a set of resources in which to transmit the CSI report, or the like. The wake-up signal can target a single UE or can target multiple UEs. A DCI communication including a wake-up signal may include a set of cyclic redundancy check (CRC) bits that are scrambled with a particular radio network temporary identifier (RNTI), such as a wake-up RNTI.

While multiple UE (multi-UE) wake-up signals are efficient in that multiple UEs can be woken up with a single wake-up signal, conveying information associated with wake-up behaviors of the UEs is problematic. For example, as the quantity of UEs to be awakened by a multi-UE wake-up signal increases, an amount of information and therefore a size of the DCI communication needs to increase (for example, to convey information that identifies BWPs for the multiple UEs, to convey CSI requests, or the like). Further, in a case when additional information is conveyed in the DCI communication, a given UE must be capable of identifying a portion of the DCI communication that carries information for the given UE (as compared to information for another UE awoken by a wake-up signal included in the DCI communication). In a case when the DCI communication does not include additional information (in other words, no additional information beyond a multi-UE wake-up signal), or when a size of the DCI communication does not permit the additional information to be fully provided to the multiple UEs, a given UE must be capable of determining a behavior associated with performing a UE wake-up in another manner.

Some aspects described herein provide techniques and apparatuses associated with multi-UE wake-up signaling. In some aspects, a UE may receive a multi-UE wake-up signal in a set of wake-up indicator fields of a DCI communication including a set of content field groups. As described herein, the UE may identify a content field group to be read by the UE, and may determine a behavior associated with performing a UE wake-up based at least in part on reading the identified content field group. Alternatively, if the UE determines that the DCI does not include any content field groups, then the UE may determine a behavior associated with performing a UE wake-up based at least in part on determining that the DCI does not include a content field group, as described below. In some aspects, the UE may determine that a quantity of multi-UE wake-up signals included in the set of wake-up indicator fields is set to a special value or is greater than a quantity of content field groups included in the DCI communication, and may determine a behavior associated with performing a UE wake-up based at least in part on determining that the quantity of multi-UE wake-up signals is set to the special value or is greater than the quantity of content field groups, as described below.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
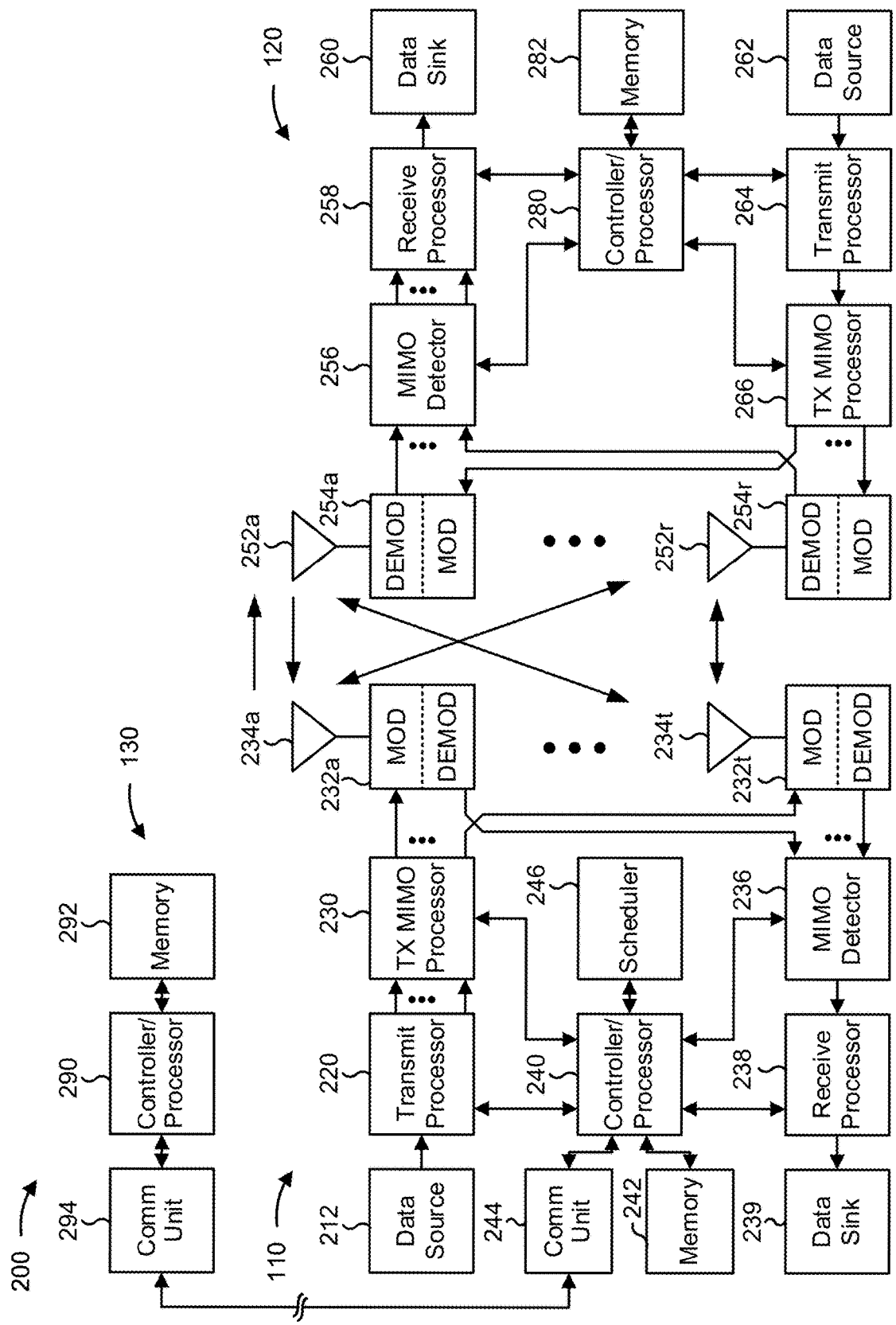
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with multi-UE wake-up signaling, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, process 800 of FIG. 8, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a multi-UE wake-up signal in a DCI communication, the DCI communication including a set of content field groups; means for identifying a content field group of the set of content field groups that is to be read by UE 120; means for determining, based at least in part on the identified content field group, a behavior associated with performing a UE wake-up operation; or the like, or combinations thereof. In some aspects, such means may include one or more components of UE 120 described in connection with FIG. 2.

In some aspects, UE 120 may include means for means for receiving a multi-UE wake-up signal in a DCI communication; means for determining that the DCI communication does not include a content field group; means for determining, based at least in part on determining that the DCI does not include a content field group, a behavior associated with performing a UE wake-up operation; or the like, or combinations thereof. In some aspects, such means may include one or more components of UE 120 described in connection with FIG. 2.

In some aspects, UE 120 may include means for receiving a multi-UE wake-up signal in a DCI communication; means for determining that a quantity of multi-UE wake-up signals included in the DCI communication is set to a special value or is greater than a quantity of content field groups included in the DCI communication; means for determining a behavior associated with performing a UE wake-up operation based at least in part on determining that the quantity of multi-UE wake-up signals is set to the special value or is greater than the quantity of content field groups; or the like, or combinations thereof. In some aspects, such means may include one or more components of UE 120 described in connection with FIG. 2.

Figure 3:
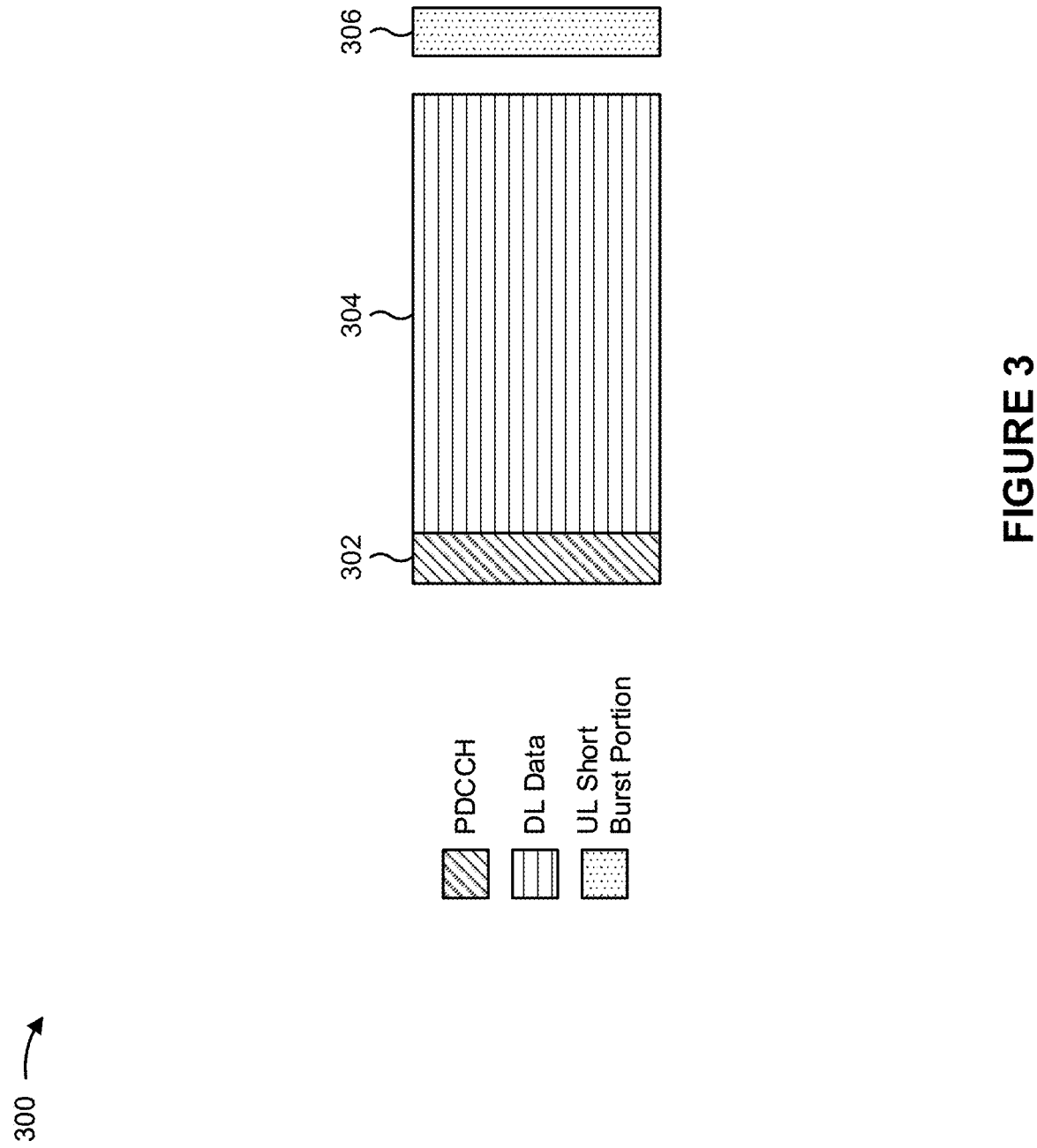
FIG. 3 is a diagram showing an example downlink (DL)-centric slot or communication structure in accordance with various aspects of the present disclosure.

FIG. 3 is a diagram showing an example downlink (DL)-centric slot 300 or communication structure in accordance with various aspects of the present disclosure. The DL-centric slot (or wireless communication structure) may include a control portion 302 during which the scheduling entity (for example, UE or BS) transmits various scheduling information or control information corresponding to various portions of the DL-centric slot to the subordinate entity (for example, UE). The control portion 302 may exist in the initial or beginning portion of the DL-centric slot. In some configurations, the control portion 302 may be a physical DL control channel PDCCH, as indicated in FIG. 3. In some aspects, the control portion 302 may include legacy PDCCH information, shortened PDCCH (sPDCCH) information), a control format indicator (CFI) value (for example, carried on a physical control format indicator channel (PCFICH)), one or more grants (for example, downlink grants, uplink grants, or the like, or combinations thereof), or the like, or combinations thereof.

The DL-centric slot may also include a DL data portion 304 during which the scheduling entity (for example, UE or BS) transmits DL data to the subordinate entity (for example, UE) using communication resources utilized to communicate DL data. The DL data portion 304 may sometimes be referred to as the payload of the DL-centric slot. In some configurations, the DL data portion 304 may be a physical downlink shared channel (PDSCH).

The DL-centric slot may also include an UL short burst portion 306 during which the subordinate entity (for example, UE) transmits reference signals or feedback to the scheduling entity (for example, UE or B S) using communication resources utilized to communicate UL data. The UL short burst portion 306 may sometimes be referred to as an UL burst, an UL burst portion, a common UL burst, a short burst, an UL short burst, a common UL short burst, a common UL short burst portion, or various other suitable terms. In some aspects, the UL short burst portion 306 may include one or more reference signals. Additionally or alternatively, the UL short burst portion 306 may include feedback information corresponding to various other portions of the DL-centric slot. For example, the UL short burst portion 306 may include feedback information corresponding to the control portion 302 or the data portion 304. Non-limiting examples of information that may be included in the UL short burst portion 306 include an acknowledgement (ACK) signal (for example, a physical uplink control channel (PUCCH) ACK, a physical uplink shared channel (PUSCH) ACK, or an immediate ACK), a negative acknowledgement (NACK) signal (for example, a PUCCH NACK, a PUSCH NACK, or an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, or various other suitable terms. This separation provides time for the switch-over from DL communication (for example, reception operation by the subordinate entity (for example, BS or UE)) to UL communication (for example, transmission by the subordinate entity (for example, UE)). The foregoing provides some examples of a DL-centric wireless communication structure, but alternative structures having similar features may exist without deviating from the aspects described herein.

Figure 4:
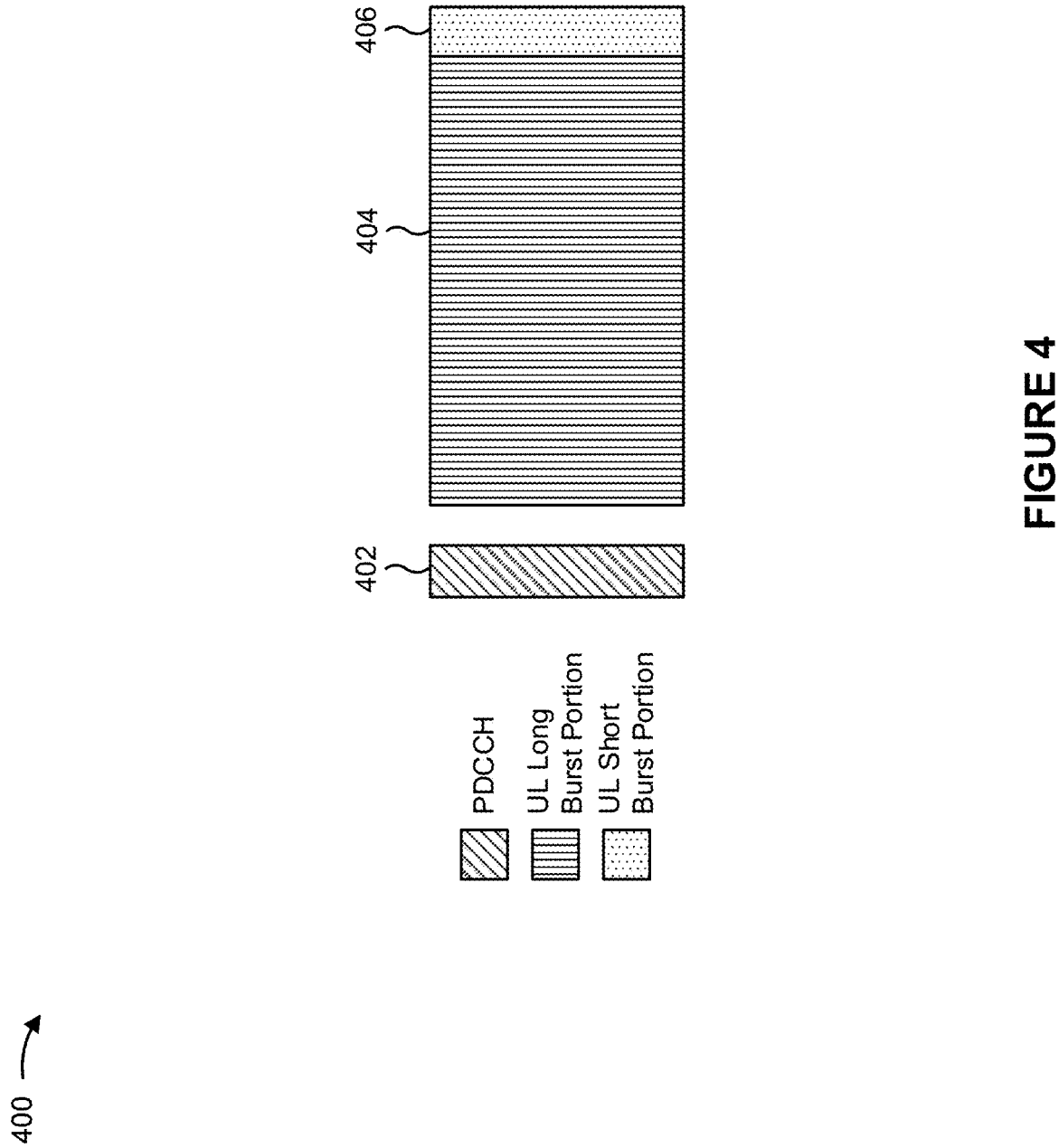
FIG. 4 is a diagram showing an example uplink (UL)-centric slot or communication structure in accordance with various aspects of the present disclosure.

FIG. 4 is a diagram showing an example uplink (UL)-centric slot 400 or communication structure in accordance with various aspects of the present disclosure. The UL-centric slot (or wireless communication structure) may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (for example, UE) to the scheduling entity (for example, UE or BS). In some configurations, the control portion 402 may be a physical DL control channel PDCCH.

As illustrated in FIG. 4, the end of the control portion 402 may be separated in time from the beginning of the UL long burst portion 404. This time separation may sometimes be referred to as a gap, guard period, guard interval, or various other suitable terms. This separation provides time for the switch-over from DL communication (for example, reception operation by the scheduling entity) to UL communication (for example, transmission operation by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is merely one example of an UL-centric wireless communication structure, and alternative structures having similar features may exist without deviating from the aspects described herein.

In some circumstances, two or more subordinate entities (for example, UEs) may communicate with each other using sidelink signals. Real-world applications of such sidelink communications may include public safety, proximity services, UE-to-network relaying, V2V communications, Internet of Everything (IoE) communications, IoT communications, mission-critical mesh, or various other suitable applications. Generally, a sidelink signal may refer to a signal communicated from one subordinate entity (for example, UE1) to another subordinate entity (for example, UE2) without relaying that communication through the scheduling entity (for example, UE or B S), even though the scheduling entity may be utilized for scheduling or control purposes. In some aspects, the sidelink signals may be communicated using a licensed spectrum band; in other aspects, the sidelink signals may be communicated using an unlicensed spectrum band.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

In a wireless communication network, a UE may be configured with a DRX cycle in order to improve a battery lifetime of a UE. The DRX cycle includes an "on duration" (also referred to as "active time") during which the UE should monitor a PDCCH, and a "DRX period" during which the UE can skip reception of downlink channels, thereby conserving battery power. A wake-up signal may be used to indicate to the UE whether the UE should expect to receive or transmit communications in an upcoming DRX on duration. Upon receiving a wake-up signal, the UE may resume monitoring and reception of one or more downlink channels in association with receiving or transmitting a communication during the DRX on duration. Conversely, if no wake-up signal is received, the UE may continue skipping reception of downlink channels.

The wake-up signal can be a DCI communication transmitted on the PDCCH. In some cases, the wake-up signal may include additional information associated with a behavior of the UE when performing a wake-up. Such additional information can include, for example, information that identifies a BWP to use upon wake-up, a request to provide a CSI report, information that identifies a set of resources in which to transmit the CSI report, or the like. The wake-up signal can target a single UE or can target multiple UEs. A DCI communication including a wake-up signal may include a set of CRC bits that are scrambled with a particular RNTI, such as a wake-up RNTI.

While multi-UE wake-up signals are efficient in that multiple UEs can be woken up with a single wake-up signal, conveying information associated with wake-up behaviors of the UEs is problematic. For example, as the quantity of UEs awoken by a multi-UE wake-up signal increases, an amount of information and therefore a size of the DCI communication needs to increase (for example, to convey information that identifies BWPs for the multiple UEs, to convey CSI requests, or the like). Further, in a case when additional information is conveyed in the DCI communication, a given UE must be capable of identifying a portion of the DCI communication that carries information for the given UE (as compared to information for another UE awoken by a wake-up signal included in the DCI communication). In a case when the DCI communication does not include additional information (in other words, no additional information beyond a multi-UE wake-up signal), or when a size of the DCI communication does not permit the additional information to be fully provided to the multiple UEs, a given UE must be capable of determining a behavior associated with performing a UE wake-up in another manner.

Some aspects described herein provide techniques and apparatuses associated with multi-UE wake-up signaling. In some aspects, a UE may receive a multi-UE wake-up signal in a set of wake-up indicator fields of a DCI communication including a set of content field groups. As described herein, the UE may identify a content field group to be read by the UE, and may determine a behavior associated with performing a UE wake-up based at least in part on reading the identified content field group. Alternatively, if the UE determines that the DCI does not include any content field groups, then the UE may determine a behavior associated with performing a UE wake-up based at least in part on determining that the DCI does not include a content field group, as described below. In some aspects, the UE may determine that a quantity of multi-UE wake-up signals included in the set of wake-up indicator fields is set to a special value or is greater than a quantity of content field groups included in the DCI communication, and may determine a behavior associated with performing a UE wake-up based at least in part on determining that the quantity of multi-UE wake-up signals is set to the special value or is greater than the quantity of content field groups, as described below.

FIGS. 5A-5D are diagrams illustrating various examples associated with multi-UE wake-up signaling in accordance with various aspects of the present disclosure.

As shown in example 500 of FIG. 5A, in a first operation 502, a UE (for example, UE 120) may receive a multi-UE wake-up signal in a DCI communication transmitted by a base station (for example base station 110).

In some aspects, the UE may determine a wake-up RNTI, associated with the UE, in association with receiving the DCI communication, and may receive the DCI communication based at least in part on the wake-up RNTI. In some aspects, the wake-up RNTI may be determined based at least in part on another RNTI associated with the UE. For example, the UE may determine the wake-up RNTI by calculating the wake-up RNTI based at least in part on another RNTI (for example, the C-RNTI) and (potentially) another value (for example, a cell identifier, a BWP identifier, or the like). In some aspects, the wake-up RNTI may be configured or calculated for the UE for all BWPs and all cells (in other words, the wake-up RNTI may be a UE level wake-up RNTI). In some aspects, the wake-up RNTI may be configured or calculated for the UE for all BWPs in a given cell (in other words, the wake-up RNTI may be a cell-level wake-up RNTI). In some aspects, the wake-up RNTI may be configured or calculated for the UE for a given BWP (in other words, the wake-up RNTI may be a BWP-level wake-up RNTI). In this case, the UE may monitor the multi-UE wake-up signal according to a last active BWP used before going to sleep.

In some aspects, the UE may receive the multi-UE wake-up signal based at least in part on information included in one or more of a set of wake-up indicator fields of the DCI communication. For example, with reference to FIG. 5B, the DCI communication received by the UE may include a set of x wake-up indicator fields (x≥1). Here, the set of wake-up indicator fields may be used to convey one or more multi-UE wake-up signals, each associated with a different set of UEs.

In some aspects, the UE may receive the multi-UE wake-up signal based at least in part on a value identified by the set of wake-up indicator fields. For example, the UE may be assigned (for example, by the base station) a group identifier (for example, a particular value). Here, upon receiving the DCI communication, the UE may determine whether a value identified by the set of wake-up indicator fields (for example, a value corresponding to a string of bit values as provided in the set of wake-up indicator fields) matches the group identifier assigned to the UE. Here, if the value identified by the set of wake-up indicator fields matches the group identifier, then the UE may determine that the DCI communication includes a multi-UE wake-up signal for the UE. In some aspects, the group identifier may be assigned to multiple UEs in order to permit the multiple UEs to receive a wake-up signal based at least in part on the same value being included in the DCI communication. In some aspects, the UE may be assigned multiple group identifiers (such that the UE can receive wake-up signals based at least in part on different group identifiers).

In some aspects, the UE may receive the wake-up signal in another manner, such as based at least in part on a bitmap scheme associated with the wake-up indicator fields. According to an example bitmap scheme, the UE may be configured to check a particular location in a bitmap associated with the UE, where the particular location in the bitmap corresponds to a particular wake-up indicator field. Here, the UE may check a value carried in the particular wake-up indicator field, and may receive the wake-up signal accordingly (for example, based at least in part on determining that the value carried in the particular wake-up indicator field matches a particular value). As another example, in some aspects, the UE may receive the wake-up signal based at least in part on a pattern scheme (for example, based at least in part on determining whether a pattern of bit values in the set of wake-up indicator fields matches a particular pattern associated with the UE).

In some aspects, based at least in part on receiving the wake-up signal, the UE may determine whether the DCI communication includes a set of content field groups. A content field group includes one or more fields of the DCI that can be used to convey information associated with a behavior of the UE when performing a UE wake-up operation. For example, a content field group may include information associated with a bandwidth part (BWP) associated with performing the UE wake-up operation (for example, information that identifies a BWP that the UE is to monitor in association with receiving a PDCCH). As another example, the content field group may include information associated with a channel state information (CSI) request (for example, information indicating that the UE is to provide a CSI report). As another example, the content field group may include information associated with a primary cell or secondary cell indication associated with performing the UE wake-up operation (for example, information that identifies a primary cell or a secondary cell via which the UE is to communicate).

With reference to FIG. 5B, the DCI communication may include a set of y content field groups (y≥0). In the example shown in FIG. 5B, a first wake-up indicator field $W_0$ is associated with a first content field group comprising fields $F_{0,0}$ and $F_{0,1}$, a second wake-up indicator field $W_1$ is associated with a second content field group comprising fields $F_{1,0}$ and $F_{1,1}$, and so on. In some aspects, the DCI communication may include one or more content field groups (an example of which is described in association with FIG. 5A). Alternatively, the DCI may not include any content field groups in some aspects (an example of which is described in association with FIG. 5C). As further shown, in some aspects, the DCI communication may include one or more padding bits (for example, in order to achieve a desired DCI communication size). In some aspects, the DCI communication may include a set of cyclic redundancy check (CRC) bits that is scrambled by a group radio network temporary identifier (RNTI), such as a wake-up RNTI.

Returning to FIG. 5A, in a second operation 504, the UE may determine that the DCI communication includes a set of content field groups. For example, the UE may determine that the DCI includes a set of content field groups based at least in part on a size of the DCI, based at least in part on identifying a field as being included in a content field group, or the like.

In a third operation 506, the UE may identify, based at least in part on determining that the DCI communication includes the set of content field groups, a content field group that is to be read by the UE.

In some aspects, the UE may identify the content field group based at least in part on information included in a set of wake-up indicator fields included in the DCI communication. Here, the information included in the set of wake-up indicator fields may be a quantity of occurrences of a particular value in a portion of the set of wake-up indicator fields that precedes a portion of the set of wake-up indicator fields corresponding to the multi-UE wake-up signal. For example, if a bitmap scheme is used for multi-UE wake-up signaling, then a quantity of occurrences of a particular value (for example, a quantity of 1s) preceding the UE's wake-up bit in the set of wake-up indicator fields may identify an index corresponding to a content field group to be read by the UE. As another example, if a pattern scheme is used for multi-UE wake-up signaling, then a quantity of occurrences of a particular value (for example, a quantity of 1s) preceding the UE's wake-up pattern in the set of wake-up indicator fields may identify an index corresponding to a content field group to be read by the UE.

In some aspects, the UE may identify the content field group based at least in part on an RNTI (for example, a cell RNTI (C-RNTI)) associated with the UE. For example, the UE may apply a modulo operation to the C-RNTI, a result of which may identify the index corresponding to the content field group to be read by the UE.

In some aspects, the UE may identify the content field group based at least in part on information included in the set of wake-up indicator fields and based at least in part on an RNTI associated with the UE (for example, a C-RNTI). For example, a combination of a quantity of occurrences of a particular value preceding the UE's wake-up in the set of wake-up indicator fields and the RNTI may be used to determine the index corresponding to the content field group to be read by the UE (for example, after performing a modulo operation).

In some aspects, the UE may identify the content field group based at least in part on a field group index that is configured on the UE (for example, an index configured on the UE by the base station at an earlier time, a default index, or the like).

In some aspects, the UE may identify the content field group based at least in part on a time-varying value and at least one of an RNTI associated with the UE or information included in the set of wake-up indicator fields. The time-varying value can include, for example, a system-frame number, a slot index, or the like. For example, a product of an RNTI and a slot index can be added to the information included in the set of wake-up indicator fields, and a modulo operation can be performed on a result of the addition. Here, a result of the modulo operation may identify the index corresponding to the content field group to be read by the UE. As another example, a product of an RNTI and a next slot index can be added to the information included in the set of wake-up indicator fields, and a modulo operation can be performed on a result. Here, a result of the modulo operation may identify the index corresponding to the content field group to be read by the UE.

In some aspects, the UE may identify the content field group based at least in part on mapping a set of wake-up indicator fields included in the DCI communication to the content field group based at least in part on a shuffling function. For example, a bitmap scheme may be used for multi-UE wake-up signaling such that a bitmap location is associated with the UE. Here, a wake-up indicator field corresponding to the bitmap location may be mapped to the content field group based at least in part on applying the shuffling function (e.g., a function that receives information associated with the wake-up indicator field as input and provides information that identifies a content field group as output). In general terms, if the set of wake-up indicator fields corresponding to the UE includes a set of bits, then the shuffling function may be used to map the set of bits to a particular content field group based at least in part on applying a shuffling function to the set of bits.

As further shown in FIG. 5A, in a fourth operation 508, the UE may read the identified content field group and may determine a behavior associated with performing a UE wake-up operation.

In some aspects, the content field group may have fewer bits in the DCI communication than a counterpart would have in a single-UE wake-up DCI communication or a scheduling DCI communication (for example, when a BWP identifier has a length of 1 bit rather than a length of 2 bits). In some aspects, the content field group may include information that identifies a subset of possible values that indicate the behavior associated with performing the UE wake-up operation. Here, when determining the behavior associated with performing the UE wake-up operation, the UE may determine the behavior based at least in part on the subset of possible values. For example, the UE may be configured with four BWPs. Here, if the BWP identifier in the content field group uses only one bit, the content field group may identify a subset of possible values that corresponds to two of the four BWPs. In this example, the UE may monitor the two BWPs in the subset. In some aspects, the subset of possible values may be configured on the UE via radio resource control (RRC) signaling or a medium access control (MAC) control element (CE).

Additionally or alternatively, the content field group may include information that identifies a portion of a value that indicates the behavior associated with performing the UE wake-up operation. Here, when determining the behavior associated with performing the UE wake-up operation, the UE may determine the behavior based at least in part on the portion of the value. In some aspects, the UE may pad the portion of the value in association with determining the behavior. For example, the content field group may identify a truncated version of a full value. Here, the UE may obtain the full value by padding (for example, using 0s) until a maximum length of the content field group is achieved. In some aspects, the maximum length of the content field group may be determined, for example, from a single-UE wake-up DCI or a scheduling DCI.

In some aspects, the behavior may indicate that the UE is to transmit a CSI report. In such a case, the UE may identify a set of resources in which to transmit the CSI report, and may generate and transmit the CSI report in the set of resources. In some aspects, the UE may identify the set of resources based at least in part on an RRC configuration, a configured grant, a default configuration, a partial grant included in the DCI communication, or the like.

In some aspects, the UE is not configured to receive a single-UE wake-up signal after receiving the multi-UE wake-up signal. In other words, in some aspects, the UE cannot be configured with both a single-UE wake-up signal and a multi-UE wake-up signal.

Alternatively, in some aspects, the UE may receive both a single-UE wake-up signal and a multi-UE wake-up signal. Thus, in some aspects, the UE may receive a single-UE wake-up signal (for example, before, after, or concurrently with receiving the multi-UE wake-up signal). Here, the UE may determine the behavior associated with performing the UE wake-up operation further based at least in part on information associated with the single-UE wake-up signal. Here, the UE may wake up when either signal indicates that the UE is to wake-up. In some aspects, if both signals indicate that the UE should wake-up, the UE follows information included in a content field group associated with the single-UE wake-up signal. In some aspects, the UE may be configured such that the UE does not expect content field groups associated with the single-UE and multi-UE wake-up signals to have conflicting values. Alternatively, the UE may be configured such that the UE follows one or more fields from the content field group associated with the single-UE wake-up signal, and one or more fields from the content field group associated with the multi-UE wake-up signal. Alternatively, the UE may be configured such that the UE does not expect the content field groups associated with the single-UE and multi-UE wake-up signals to have the same content fields.

In some aspects, the wake-up operation may include monitoring a PDCCH in association with receiving or transmitting a communication in an upcoming DRX cycle on-duration. In other words, in some aspects, performing the UE wake-up operation may include enabling monitoring of the PDCCH in association with receiving or transmitting a communication in an upcoming DRX cycle on-duration. In some aspects, the behavior associated with performing the UE wake-up operation may include monitoring a particular BWP in association with monitoring the PDCCH. In some aspects, the behavior associated with performing the UE wake-up operation may include transmitting a CSI report.

In some aspects, as indicated above, the DCI communication may not include any content field groups. FIG. 5C is a diagram of an example 520 in which the DCI communication does not include any content field groups.

As shown in FIG. 5C, in a first operation 522, a UE (for example, UE 120) may receive a multi-UE wake-up signal in a DCI communication transmitted by a base station (for example base station 110), in a manner similar to that described above in association with FIGS. 5A and 5B.

In a second operation 524, the UE may determine that the DCI communication does not include a content field group. For example, the UE may determine that the DCI communication does not include any content field groups based at least in part on a size of the DCI communication, based at least in part on identifying no fields as being included in a content field group, or the like.

In a third operation 526, the UE may, based at least in part on determining that the DCI does not include a content field group, determine a behavior associated with performing a UE wake-up operation. In some aspects, the UE may determine the behavior based at least in part on a configuration of the UE. For example, a behavior to be implemented by the UE when the DCI communication does not include a content field group may be configured on the UE (for example, via RRC configuration, via a default configuration, or the like). Here, upon determining that the DCI communication does not include a content field group, the UE may identify the behavior configured on the UE and proceed accordingly.

In some aspects, the UE may determine the behavior based at least in part on a pre-sleep state of the UE. For example, upon determining that the DCI communication does not include a content field group, the UE may identify a pre-sleep state (for example, a last used BWP) and may proceed based at least in part on the pre-sleep state (for example, by monitoring the last used BWP).

Other characteristics of the DCI communication and/or operations performed by the UE may be similar to those described in association with FIGS. 5A and 5B.

Figure 5D:
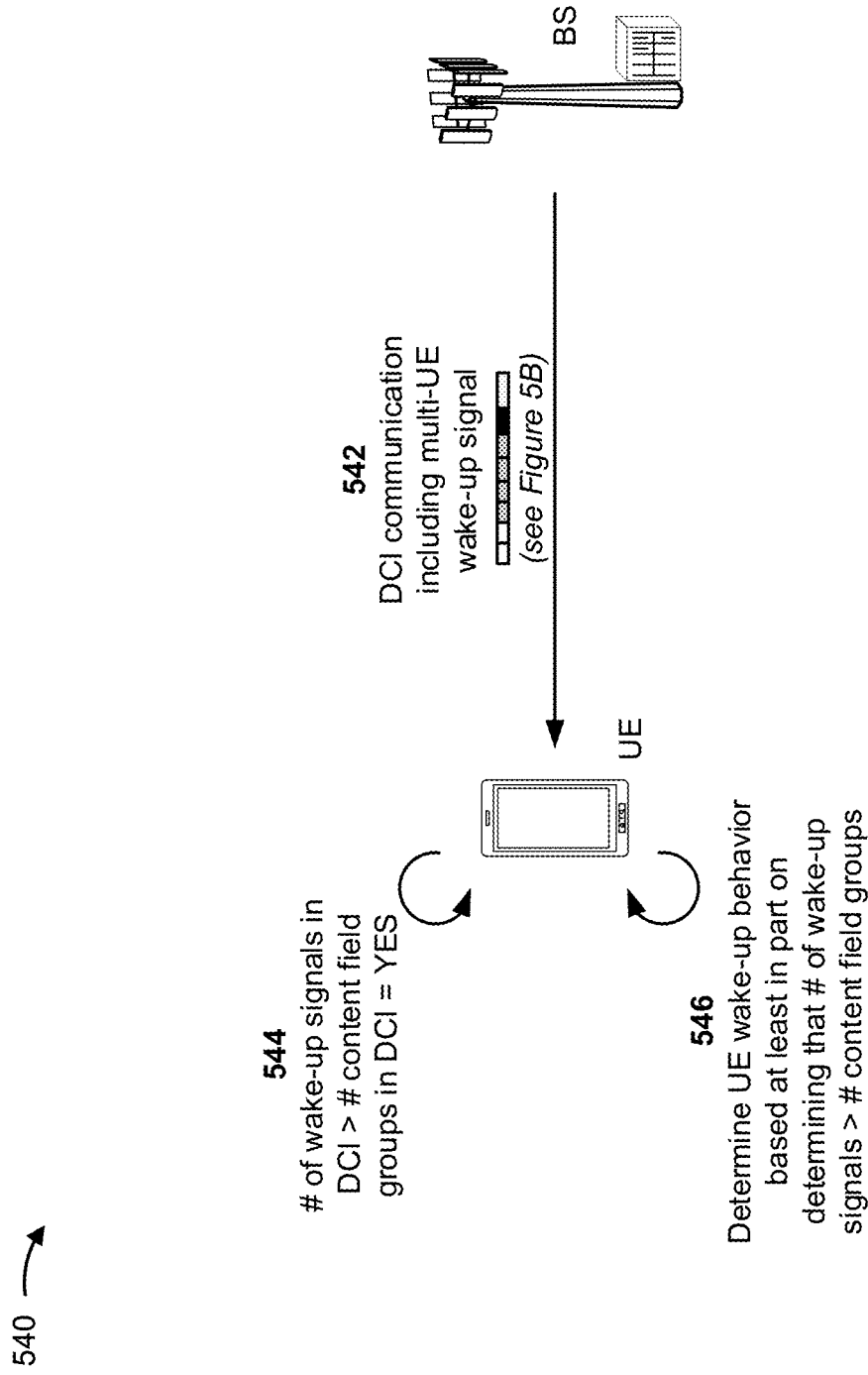

In some aspects, a quantity of UEs indicated to wake-up by the multi-UE wake-up signal may be greater than a quantity of content field groups included in the DCI communication. One such case (when the DCI communication does not include any content field groups) is described above in association with FIG. 5C. FIG. 5D is a diagram of an example 540 in which a quantity of UEs indicated to wake-up by the multi-UE wake-up signal is greater than a quantity of content field groups included in the DCI communication.

As shown in FIG. 5D, in a first operation 542, a UE (for example, UE 120) may receive a multi-UE wake-up signal in a DCI communication transmitted by a base station (for example base station 110), in a manner similar to that described above in association with FIGS. 5A and 5B.

In a second operation 544, the UE may determine that a quantity of multi-UE wake-up signals included in the DCI communication is greater than a quantity of content field groups included in the DCI communication. For example, the UE may determine that the DCI includes a set of content field groups, and may identify a quantity of content field groups in the set. Next, the UE may determine a quantity of wake-up signals conveyed by the DCI communication (for example, by counting a quantity of 1s present in the set of wake-up indicator fields when a bitmap scheme is used).

In a third operation 546, the UE may determine a behavior associated with performing a UE wake-up operation based at least in part on determining that the quantity of multi-UE wake-up signals is greater than the quantity of content field groups.

In some aspects, even when the quantity of multi-UE wake-up signals is greater than the quantity of content field groups, the UE may be configured to determine the behavior based at least in part on reading a content field group associated with the UE. In such a case, the UE may identify a content field group, of the set of content field groups, to be read by the UE using a technique described above in association with FIG. 5A (for example, such that the UE determines the behavior based at least in part on information included in the content field group). In some aspects, the UE may identify the content field group based at least in part on information included in a set of wake-up indicator fields included in the DCI communication, as described above. In some aspects, the UE may identify the content field group based at least in part on mapping the set of wake-up indicator fields included in the DCI communication to the content field group based at least in part on a shuffling function, as described above.

In some aspects, when the quantity of multi-UE wake-up signals included in the DCI communication is greater than the quantity of content field groups included in the DCI communication, the UE may determine the behavior associated with performing the UE wake-up operation based at least in part on whether the UE is included in a set of UEs, where each UE of the set of UEs is assigned to a respective content field group of the set of content field groups included in the DCI communication. For example, the UE may determine whether the UE is included in the set of UEs (that is, whether the UE is to read a content field group included in the DCI), and may determine the behavior based at least in part on whether the UE is included in the set of UEs. In some aspects, when the UE is included in the set of UEs, the UE may determine the behavior based at least in part on information included in a content field group to which the UE is assigned. In some aspects, when the UE is not included in the set of UEs, the UE may determine the behavior based at least in part on, for example, a behavior configured on the UE, a pre-sleep state of the UE, a behavior of a previous wake-up, or a legacy DRX behavior.

As a particular example, assume that UE1 through X are signaled to wake-up and there are Y content field groups included in the DCI communication. Here, the number of UEs to wake-up is greater than the number of content field groups (X>Y). In such a case, UE1 through UE Y may be assigned to corresponding content field groups, and may determine the behavior associated with performing the UE wake-up operation based at least in part on behaviors indicated by respective content field groups assigned to UE1 through UE Y. In this example, UE Y+1 through UE X, which are not assigned to content field groups, may determine the behavior associated with performing the UE wake-up operation based at least in part on a pre-configured behavior, a pre-sleep state of the UE, a behavior associated with a previous wake-up, a legacy DRX behavior, or the like.

In some aspects, the UE may determine the behavior based at least in part on a configuration of the UE. For example, a behavior to be implemented by the UE when the quantity of multi-UE wake-up signals is greater than the quantity of content field groups may be configured on the UE (for example, via RRC configuration, via a default configuration, or the like). Here, upon determining that the quantity of multi-UE wake-up signals is greater than the quantity of content field groups, the UE may identify the behavior configured on the UE and proceed accordingly.

In some aspects, the UE may determine the behavior based at least in part on a pre-sleep state of the UE. For example, upon determining that the quantity of multi-UE wake-up signals is greater than the quantity of content field groups, the UE may identify a pre-sleep state (for example, a last used BWP) and may proceed based at least in part on the pre-sleep state (for example, by monitoring the last used BWP).

In some aspects, the UE may determine the behavior based at least in part on a particular value indicated by the set of wake-up indicator fields. For example, the UE may determine a particular value indicated by the set of wake-up indicator fields (e.g., after determining that the quantity of multi-UE wake-up signals is greater than the quantity of content field groups, without determining whether the quantity of multi-UE wake-up signals is greater than the quantity of content field groups, or the like). Here, the particular value may indicate the behavior associated with performing the UE wake-up operation. For example, if the set of wake-up indicator fields is a string of the same value (for example, all 1s or all 0s), the UE may be configured to interpret this as a special value. Continuing with this example, a first special value (for example, all 1s) may be used to indicate all UEs to follow a first behavior (for example, identifying a content field group and determining a behavior in the manner described above) and a second special value (for example, all 0s) may indicate a second behavior (for example, following a configured behavior, returning to a pre-sleep state, or the like). Notably, in some aspects, the UE may be configured not to interpret the particular value indicated by the set of wake-up indicator fields as a special value when the quantity of multi-UE wake-up signals is less than or equal to (in other words, not greater than) the quantity of content field groups. In some aspects, the UE may be configured to interpret the particular value indicated by the set of wake-up indicator fields as a special value regardless of whether the quantity of multi-UE wake-up signals is greater than or equal to the quantity of content field groups. In some aspects, a restriction may be implemented such that a quantity of UEs indicated to wake-up cannot exceed the quantity of content field groups unless the set of wake-up indicator fields indicates a special value.

Other characteristics of the DCI communication and/or operations performed by the UE may be similar to those described in association with FIGS. 5A-5C.

Figure 6:
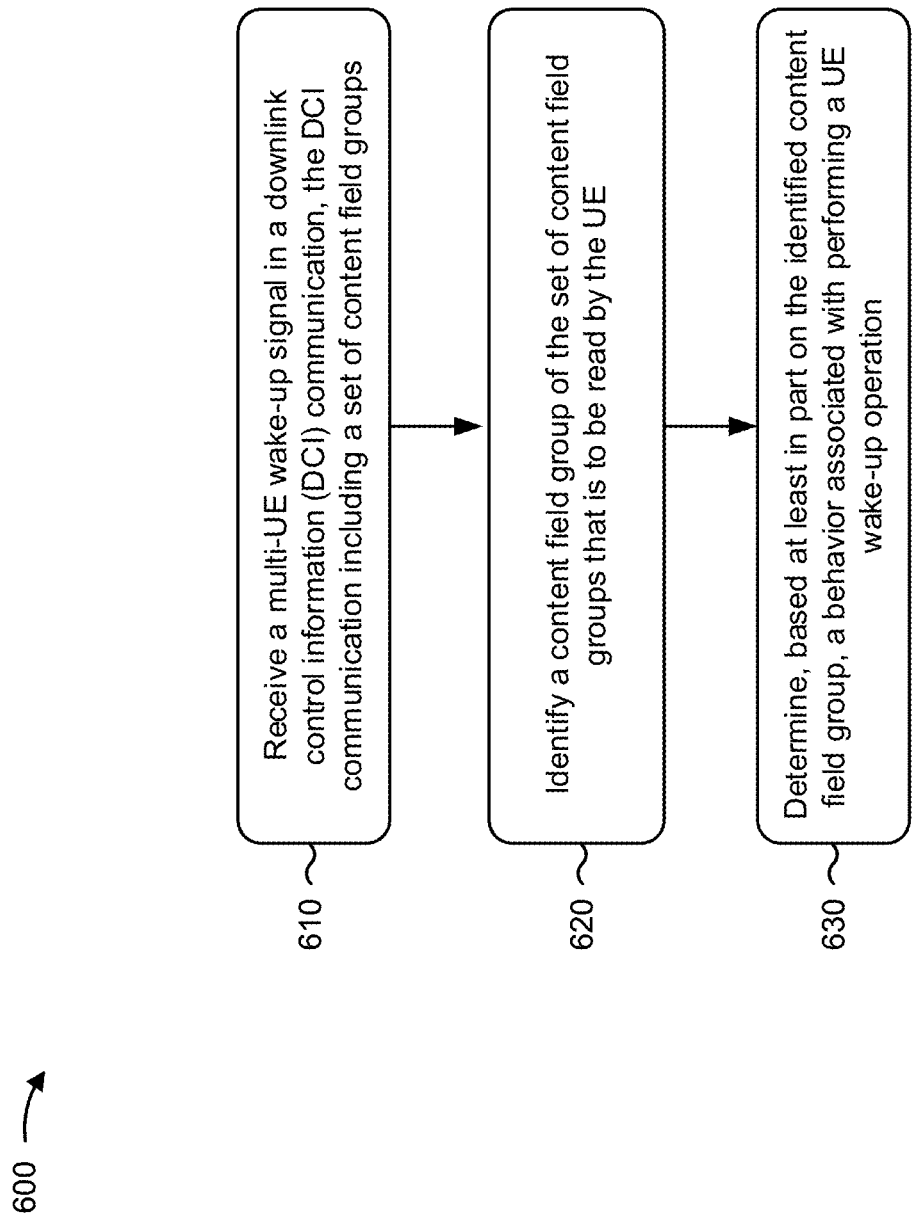
FIG. 6 is a diagram illustrating an example process performed by a UE in accordance with various aspects of the present disclosure.

FIG. 6 is a diagram illustrating an example process 600 performed, for example, by a UE, in accordance with various aspects of the present disclosure. Example process 600 is an example where a UE (for example, UE 120 and/or the like) performs operations associated with multi-user equipment wake-up signaling.

As shown in FIG. 6, in some aspects, process 600 may include receiving a multi-UE wake-up signal in a DCI communication, the DCI communication including a set of content field groups (block 610). For example, the UE (for example, using receive processor 258, controller/processor 280, memory 282, and/or the like) may receive a multi-UE wake-up signal in a DCI communication, the DCI communication including a set of content field groups, as described above.

As further shown in FIG. 6, in some aspects, process 600 may include identifying a content field group of the set of content field groups that is to be read by the UE (block 620). For example, the UE (for example, using receive processor 258, controller/processor 280, memory 282, and/or the like) may identify a content field group of the set of content field groups that is to be read by the UE, as described above.

As further shown in FIG. 6, in some aspects, process 600 may include determining, based at least in part on the identified content field group, a behavior associated with performing a UE wake-up operation (block 630). For example, the UE (for example, using receive processor 258, controller/processor 280, memory 282, and/or the like) may determine, based at least in part on the identified content field group, a behavior associated with performing a UE wake-up operation, as described above.

Process 600 may include additional aspects, such as any single aspect or any combination of aspects described below and/or in connection with one or more other processes described elsewhere herein.

In a first aspect, the content field group includes information associated with at least one of a bandwidth part associated with performing the UE wake-up operation, a CSI request associated with performing the UE wake-up operation, or a primary cell or secondary cell indication associated with performing the UE wake-up operation.

In a second aspect, alone or in combination with the first aspect, the DCI communication includes one or more padding bits.

In a third aspect, alone or in combination with any one or more of the first and second aspects, the DCI communication includes a set of CRC bits that is scrambled by a wake-up RNTI.

In a fourth aspect, alone or in combination with any one or more of the first through third aspects, the UE may determine that a value identified by a set of wake-up indicator fields included in the DCI communication matches an identifier assigned to the UE, the identifier being one of a set of identifiers assigned to the UE. Here, when receiving the multi-UE wake-up signal, the UE may receive the multi-UE wake-up signal based at least in part on determining that the value identified by the set of wake-up indicator fields matches the identifier assigned to the UE.

In a fifth aspect, alone or in combination with any one or more of the first through fourth aspects, when identifying the content field group, the UE may identify the content field group based at least in part on information included in a set of wake-up indicator fields included in the DCI communication.

In a sixth aspect, in combination with the fifth aspect, the information included in the set of wake-up indicator fields is a quantity of occurrences of a particular value in a portion of the set of wake-up indicator fields that precedes a portion of the set of wake-up indicator fields corresponding to the multi-UE wake-up signal.

In a seventh aspect, alone or in combination with any one or more of the first through sixth aspects, when identifying the content field group, the UE may identify the content field group based at least in part on a C-RNTI associated with the UE.

In an eighth aspect, alone or in combination with any one or more of the first through seventh aspects, when identifying the content field group, the UE may identify the content field group based at least in part on information included in a set of wake-up indicator fields included in the DCI communication and based at least in part on a C-RNTI associated with the UE.

In a ninth aspect, alone or in combination with any one or more of the first through eighth aspects, when identifying the content field group, the UE may identify the content field group based at least in part on a field group index that is configured on the UE.

In a tenth aspect, alone or in combination with any one or more of the first through ninth aspects, when identifying the content field group, the UE may identify the content field group based at least in part on a time-varying value and at least one of a RNTI associated with the UE or information included in a set of wake-up indicator fields included in the DCI communication.

In an eleventh aspect, in combination with the tenth aspect, the time-varying value includes a system-frame number or a slot index.

In a twelfth aspect, alone or in combination with any one or more of the first through eleventh aspects, the content field group includes information that identifies a subset of possible values that indicate the behavior associated with performing the UE wake-up operation. Here, when determining the behavior associated with performing the UE wake-up operation, the UE may determine the behavior based at least in part on the subset of possible values.

In a thirteenth aspect, in combination with the twelfth aspect, the subset of possible values is configured on the UE via at least one of RRC signaling or a medium access control control element (MAC-CE).

In a fourteenth aspect, alone or in combination with any one or more of the first through thirteenth aspects, the content field group includes information that identifies a portion of a value that indicates the behavior associated with performing the UE wake-up operation. Here, when determining the behavior associated with performing the UE wake-up operation, the UE may determine the behavior based at least in part on the portion of the value.

In a fifteenth aspect, in combination with the fourteenth aspect, the UE may pad the portion of the value in association with determining the behavior.

In a sixteenth aspect, alone or in combination with any one or more of the first through fifteenth aspects, the behavior indicates that the UE is to transmit a CSI report. Here, the UE may identify a set of resources in which to transmit the CSI report, and transmit the CSI report in the set of resources. That is, in some examples, the behavior indicates that the UE is to transmit a CSI report, and the process 600 may further include identifying a set of resources in which to transmit the CSI report and transmitting the CSI report in the set of resources.

In a seventeenth aspect, in combination with the sixteenth aspect, when identifying the set of resources, the UE may identify the set of resources based at least in part on at least one of an RRC configuration, a configured grant, a default configuration, or a partial grant included in the DCI communication. That is, in some examples, the identifying the set of resources includes identifying the set of resources based at least in part on an RRC configuration, a configured grant, a default configuration, or a partial grant included in the DCI communication.

In an eighteenth aspect, alone or in combination with any one or more of the first through seventeenth aspects, the UE is not configured to receive a single-UE wake-up signal after receiving the multi-UE wake-up signal.

In a nineteenth aspect, alone or in combination with any one or more of the first through eighteenth aspects, the UE may receive a single-UE wake-up signal, and may determine the behavior associated with performing the UE wake-up operation further based at least in part on information associated with the single-UE wake-up signal.

In a twentieth aspect, alone or in combination with any one or more of the first through nineteenth aspects, the UE may determine a wake-up RNTI associated with the UE, and may receive the DCI communication based at least in part on the wake-up RNTI. That is, in some examples, the process 600 may further include determining a wake-up RNTI associated with the UE and receiving the DCI communication based at least in part on the wake-up RNTI.

In a twenty-first aspect, in combination with the twentieth aspect, the wake-up RNTI is determined based at least in part on another RNTI associated with the UE.

In a twenty-second aspect, alone or in combination with any one or more of the twentieth and twenty-first aspects, the wake-up RNTI is determined based at least in part on a cell identifier, a cell group identifier, or a bandwidth part identifier.

In a twenty-third aspect, alone or in combination with any one or more of the twentieth through twenty-second aspects, the wake-up RNTI is a UE-level wake-up RNTI.

In a twenty-fourth aspect, alone or in combination with any one or more of the twentieth through twenty-second aspects, the wake-up RNTI is a cell-level wake-up RNTI.

In a twenty-fifth aspect, alone or in combination with any one or more of the twentieth through twenty-second aspects, the wake-up RNTI is a BWP-level wake-up RNTI.

In a twenty-sixth aspect, alone or in combination with any one or more of the first through twenty-fifth aspects, performing the UE wake-up operation includes enabling monitoring of a PDCCH in association with receiving or transmitting a communication in an upcoming DRX cycle on-duration.

In a twenty-seventh aspect, alone or in combination with any one or more of the first through twenty-sixth aspects, the behavior includes monitoring a particular bandwidth part.

In a twenty-eighth aspect, alone or in combination with any one or more of the first through twenty-seventh aspects, the behavior includes transmitting a CSI report.

In a twenty-ninth aspect, alone or in combination with any one or more of the first through twenty-eighth aspects, identifying the content field group includes mapping a set of wake-up indicator fields included in the DCI communication to the content field group based at least in part on a shuffling function.

In a thirtieth aspect, alone or in combination with any one or more of the first through twenty-ninth aspects, the multi-UE wake-up signal is received based at least in part on a bitmap scheme associated with a set of wake-up indicator fields included in the DCI communication.

Figure 7:
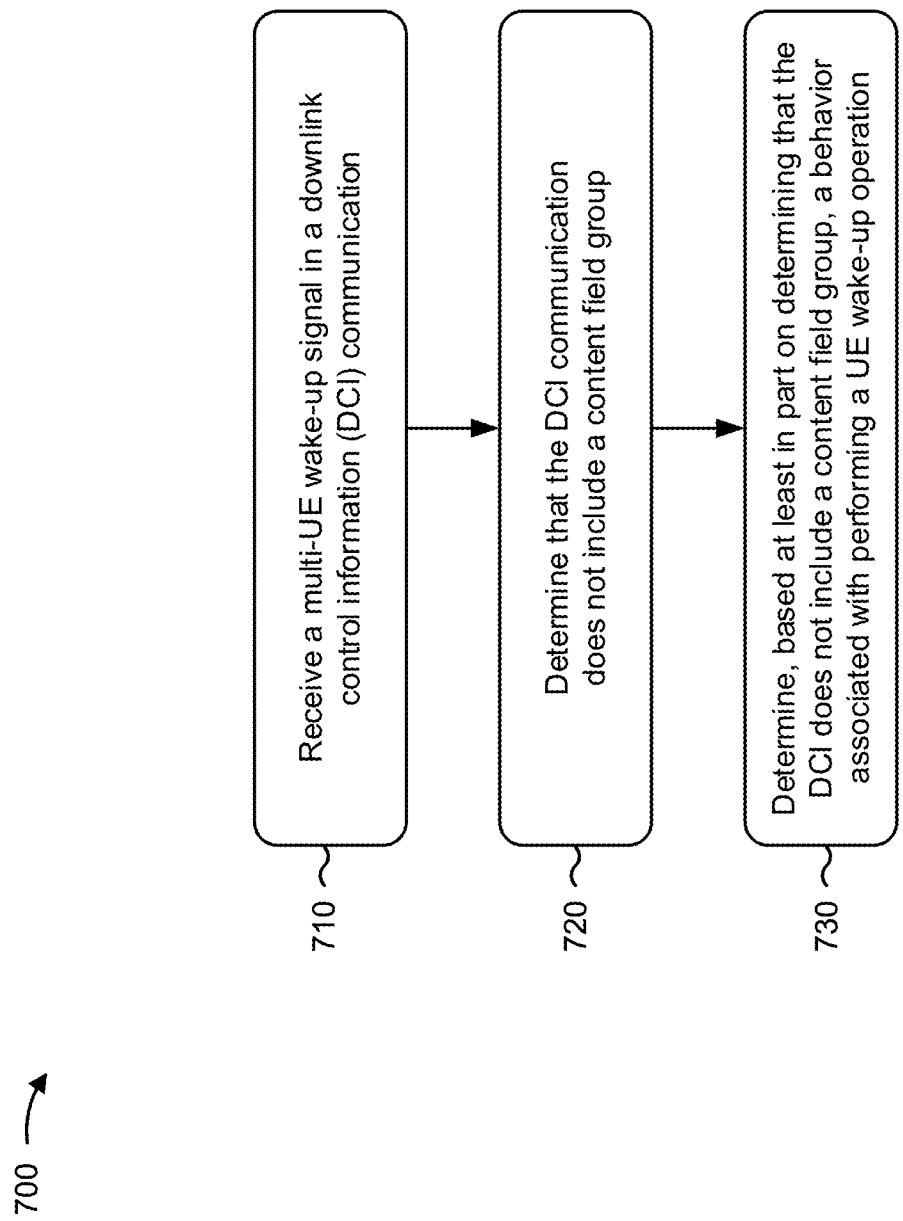
FIG. 7 is a diagram illustrating an example process performed by a UE in accordance with various aspects of the present disclosure.

FIG. 7 is a diagram illustrating an example process 700 performed, for example, by a UE, in accordance with various aspects of the present disclosure. Example process 700 is an example where a UE (for example, UE 120 and/or the like) performs operations associated with multi-user equipment wake-up signaling.

As shown in FIG. 7, in some aspects, process 700 may include receiving a multi-UE wake-up signal in a DCI communication (block 710). For example, the UE (for example, using receive processor 258, controller/processor 280, memory 282, and/or the like) may receive a multi-UE wake-up signal in a DCI communication, as described above.

As further shown in FIG. 7, in some aspects, process 700 may include determining that the DCI communication does not include a content field group (block 720). For example, the UE (for example, using receive processor 258, controller/processor 280, memory 282, and/or the like) may determine that the DCI communication does not include a content field group, as described above.

As further shown in FIG. 7, in some aspects, process 700 may include determining, based at least in part on determining that the DCI does not include a content field group, a behavior associated with performing a UE wake-up operation (block 730). For example, the UE (for example, using receive processor 258, controller/processor 280, memory 282, and/or the like) may determine, based at least in part on determining that the DCI does not include a content field group, a behavior associated with performing a UE wake-up operation, as described above.

Process 700 may include additional aspects, such as any single aspect or any combination of aspects described below and/or in connection with one or more other processes described elsewhere herein.

In a first aspect, the UE may identify a behavior configured on the UE and, when determining the behavior, may determine the behavior further based at least in part on the behavior configured on the UE.

In a second aspect, alone or in combination with the first aspect, the UE may identify a pre-sleep state of the UE and, when determining the behavior, may determine the behavior further based at least in part on the pre-sleep state of the UE.

In a third aspect, alone or in combination with any one or more of the first and second aspects, the DCI communication includes one or more padding bits.

In a fourth aspect, alone or in combination with any one or more of the first through third aspects, the DCI communication includes a set of CRC bits that is scrambled by a wake-up RNTI.

In a fifth aspect, alone or in combination with any one or more of the first through fourth aspects, the UE may determine that a value identified by a set of wake-up indicator fields included in the DCI communication matches an identifier assigned to the UE, the identifier being one of a set of identifiers assigned to the UE. Here, when receiving the multi-UE wake-up signal, the UE may receive the multi-UE wake-up signal based at least in part on determining that the value identified by the set of wake-up indicator fields matches the identifier assigned to the UE.

In a sixth aspect, alone or in combination with any one or more of the first through fifth aspects, the behavior indicates that the UE is to transmit a CSI report. Here, the UE may identify a set of resources in which to transmit the CSI report, and transmit the CSI report in the set of resources.

In a seventh aspect, in combination with the sixth aspect, when identifying the set of resources, the UE may identify the set of resources based at least in part on at least one of an RRC configuration, a configured grant, a default configuration, or a partial grant included in the DCI communication.

In an eighth aspect, alone or in combination with any one or more of the first through seventh aspects, the UE is configured not to receive a single-UE wake-up signal after receiving the multi-UE wake-up signal.

In a ninth aspect, alone or in combination with any one or more of the first through eighth aspects, the UE may receive a single-UE wake-up signal, and determine the behavior associated with performing the UE wake-up operation further based at least in part on information associated with the single-UE wake-up signal.

In a tenth aspect, alone or in combination with any one or more of the first through ninth aspects, the UE may determine a wake-up RNTI associated with the UE, and receive the DCI communication based at least in part on the wake-up RNTI.

In an eleventh aspect, in combination with the tenth aspect, the wake-up RNTI is determined based at least in part on another RNTI associated with the UE.

In a twelfth aspect, in combination with any one or more of the tenth and eleventh aspects, the wake-up RNTI is determined based at least in part on a cell identifier or a bandwidth part identifier.

In a thirteenth aspect, in combination with any one or more of the tenth and eleventh aspects, the wake-up RNTI is a UE-level wake-up RNTI.

In a fourteenth aspect, in combination with any one or more of the tenth and eleventh aspects, the wake-up RNTI is a cell-level wake-up RNTI.

In a fifteenth aspect, in combination with any one or more of the tenth and eleventh aspects, the wake-up RNTI is a BWP-level wake-up RNTI.

In a sixteenth aspect, alone or in combination with any one or more of the first through fifteenth aspects, performing the UE wake-up operation includes enabling monitoring of a PDCCH in association with receiving or transmitting a communication in an upcoming DRX cycle on-duration.

In a seventeenth aspect, alone or in combination with any one or more of the first through sixteenth aspects, the behavior includes monitoring a particular bandwidth part.

In an eighteenth aspect, alone or in combination with any one or more of the first through seventeenth aspects, the behavior includes transmitting a CSI report.

Figure 8:
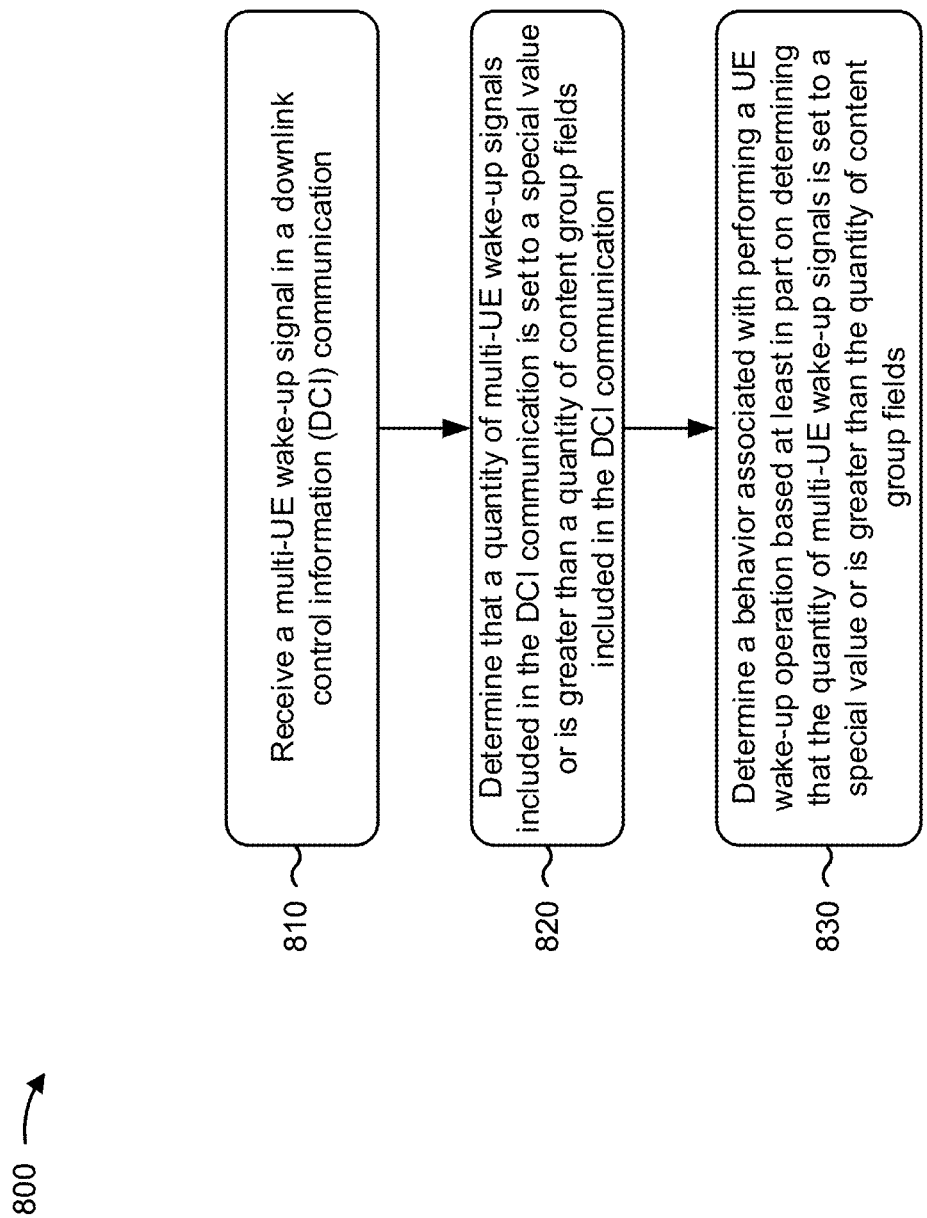
FIG. 8 is a diagram illustrating an example process performed by a UE in accordance with various aspects of the present disclosure.

FIG. 8 is a diagram illustrating an example process 800 performed, for example, by a UE, in accordance with various aspects of the present disclosure. Example process 800 is an example where a UE (for example, UE 120 and/or the like) performs operations associated with multi-user equipment wake-up signaling.

As shown in FIG. 8, in some aspects, process 800 may include receiving a multi-UE wake-up signal in a DCI communication (block 810). For example, the UE (for example, using receive processor 258, controller/processor 280, memory 282, and/or the like) may receive a multi-UE wake-up signal in a DCI communication, as described above.

As further shown in FIG. 8, in some aspects, process 800 may include determining that a quantity of multi-UE wake-up signals included in the DCI communication is set to a special value or is greater than a quantity of content field groups included in the DCI communication (block 820). For example, the UE (for example, using receive processor 258, controller/processor 280, memory 282, and/or the like) may determine that a quantity of multi-UE wake-up signals included in the DCI communication is set to a special value or is greater than a quantity of content field groups included in the DCI communication, as described above.

As further shown in FIG. 8, in some aspects, process 800 may include determining a behavior associated with performing a UE wake-up operation based at least in part on determining that the quantity of multi-UE wake-up signals is set to the special value or is greater than the quantity of content field groups (block 830). For example, the UE (for example, using receive processor 258, controller/processor 280, memory 282, and/or the like) may determine a behavior associated with performing a UE wake-up operation based at least in part on determining that the quantity of multi-UE wake-up signals is set to the special value or is greater than the quantity of content field groups, as described above.

Process 800 may include additional aspects, such as any single aspect or any combination of aspects described below and/or in connection with one or more other processes described elsewhere herein In a first aspect, the UE may determine that the DCI communication includes a set of content field groups, and identify a content field group, of the set of content field groups, to be read by the UE. Here, when determining the behavior associated with performing the UE wake-up operation, the UE may determine the behavior based at least in part on information included in the content field group.

In a second aspect, in combination with the first aspect, when identifying the content field group, the UE may identify the content field group based at least in part on information included in a set of wake-up indicator fields included in the DCI communication.

In a third aspect, alone or in combination with any one or more of the first and second aspects, the UE may identify a behavior configured on the UE based at least in part on determining that the quantity of multi-UE wake-up signals is set to the special value or is greater than the quantity of content field groups. Here, when determining the behavior associated with performing the UE wake-up operation, the UE may determine the behavior associated with performing the UE wake-up operation further based at least in part on the behavior configured on the UE.

In a fourth aspect, alone or in combination with any one or more of the first through third aspects, the may identify a pre-sleep state of the UE based at least in part on determining that the quantity of multi-UE wake-up signals is set to the special value or is greater than the quantity of content field groups. Here, when determining the behavior, the UE may determine the behavior associated with performing the UE wake-up operation further based at least in part on the pre-sleep state of the UE.

In a fifth aspect, alone or in combination with any one or more of the first through fourth aspects, the UE may determine that a set of wake-up indicator fields included in the DCI communication indicates a particular value based at least in part on determining that the quantity of multi-UE wake-up signals is set to the special value or is greater than the quantity of content field groups. Here, when determining the behavior, the UE may determine the behavior further based at least in part on the particular value indicated by the set of wake-up indicator fields.

In a sixth aspect, alone or in combination with any one or more of the first through fifth aspect, performing the UE wake-up operation includes enabling monitoring of a PDCCH in association with receiving or transmitting a communication in an upcoming DRX cycle on-duration.

In a seventh aspect, alone or in combination with any one or more of the first through sixth aspects, the behavior includes monitoring a particular bandwidth part.

In an eighth aspect, alone or in combination with any one or more of the first through seventh aspects, the behavior includes transmitting a CSI report.

In a ninth aspect, alone or in combination with any one or more of the first through eighth aspects, identifying the content field group includes mapping a set of wake-up indicator fields included in the DCI communication to the content field group based at least in part on a shuffling function.

In a tenth aspect, alone or in combination with any one or more of the first through ninth aspects, when the quantity of multi-UE wake-up signals included in the DCI communication is greater than the quantity of content field groups included in the DCI communication, determining the behavior associated with performing the UE wake-up operation includes determining whether the UE is included in a set of UEs each of which is assigned to a respective content field group of a set of content fields groups included in the DCI communication; and determining the behavior based at least in part on whether the UE is included in the set of UEs.

In an eleventh aspect, alone or in combination with any one or more of the first through tenth aspects, when the UE is included in the set of UEs, the behavior is determined based at least in part on information included in a content field group to which the UE is assigned.

In a twelfth aspect, alone or in combination with any one or more of the first through eleventh aspects, when the UE is not included in the set of UEs, the behavior is determined based at least in part on at least one of: a behavior configured on the UE, a pre-sleep state of the UE, a behavior of a previous UE wake-up, or a legacy DRX behavior.

Figure 9:
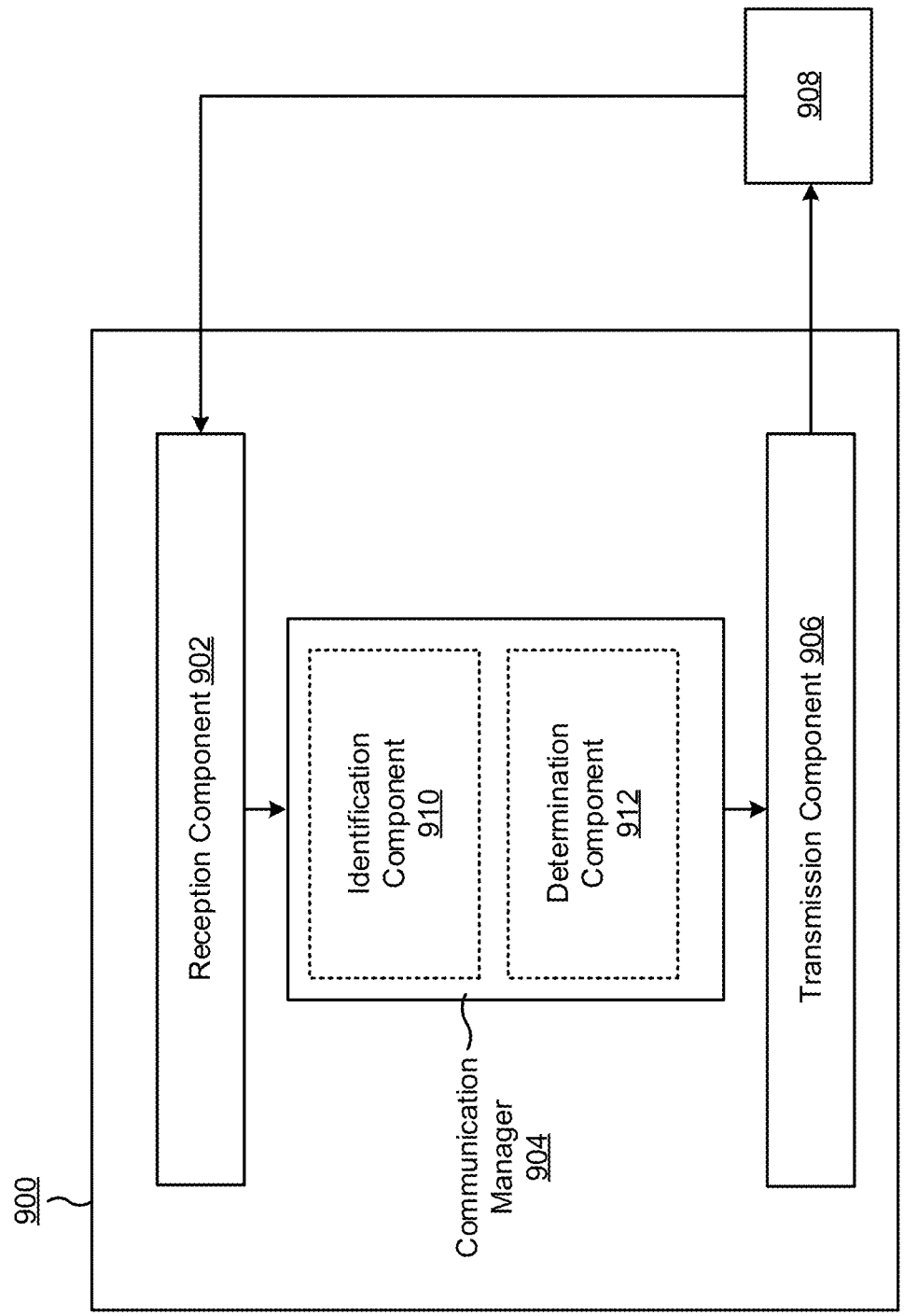
FIG. 9 is a block diagram of an example apparatus for wireless communication in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 5A-5D. Additionally or alternatively, the apparatus 900 may be configured to perform one or more processes described herein, such as process 600 of FIG. 6, process 700 of FIG. 7, process 800 of FIG. 8 or a combination thereof. In some aspects, the apparatus 900 may include one or more components of the UE described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 2. In some aspects, the transmission component 906 may be collocated with the reception component 902 in a transceiver.

In some aspects, the communication manager 904 may receive or may cause reception component 902 to receive a multi-UE wake-up signal in a DCI communication, the DCI communication including a set of content field groups; identify a content field group of the set of content field groups that is to be read by the UE; and determine, based at least in part on the identified content field group, a behavior associated with performing a UE wake-up operation. In some aspects, the communication manager 904 may receive or may cause reception component 902 to receive a multi-UE wake-up signal in a DCI communication; determine that the DCI communication does not include a content field group; and determine, based at least in part on determining that the DCI does not include a content field group, a behavior associated with performing a UE wake-up operation. In some aspects, the communication manager 904 may receive or may cause reception component 902 to receive a multi-UE wake-up signal in a DCI communication; determine that a quantity of multi-UE wake-up signals included in the DCI communication is set to a special value or is greater than a quantity of content field groups included in the DCI communication; and determine a behavior associated with performing a UE wake-up operation based at least in part on determining that the quantity of multi-UE wake-up signals is set to the special value or is greater than the quantity of content field groups. In some aspects, the communication manager 904 may include a controller/processor, a memory, or a combination thereof, of the UE described above in connection with FIG. 2.

In some aspects, the communication manager 904 may include a set of components, such as an identification component 910, a determination component 912, or a combination thereof. Alternatively, the set of components may be separate and distinct from the communication manager 904. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The identification component 910 may identify a content field group of the set of content field groups that is to be read by a UE, as described herein. When a behavior associated with performing a UE wake-up operation indicates that the UE is to transmit a CSI report, the identification component 910 may identify a set of resources in which to transmit the CSI report, and may transmit or cause transmission component 906 to transmit the CSI report in the set of resources. The identification component 910 may identify the set of resources based at least in part on an RRC configuration, a configured grant, a default configuration, or a partial grant included in the DCI communication.

The determination component 912 may determine, based at least in part on the identified content field group, a behavior associated with performing a UE wake-up operation, as described herein. The determination component 912 may determine a wake-up RNTI associated with the UE based at least in part on another RNTI associated with the UE, a cell identifier, a cell group identifier, or a bandwidth part identifier. The determination component 912 may receive or may cause reception component 902 to receive the DCI communication based at least in part on the wake-up RNTI. In some aspects, the wake-up RNTI is a cell group-level wake-up RNTI.

The determination component 912 may determine that a DCI communication does not include a content field group, and may determine, based at least in part on determining that the DCI does not include a content field group, a behavior associated with performing a UE wake-up operation, as described herein.

The determination component 912 may determine that a quantity of multi-UE wake-up signals included in the DCI communication is set to a special value or is greater than a quantity of content field groups included in the DCI communication, and may determine a behavior associated with performing a UE wake-up operation based at least in part on determining that the quantity of multi-UE wake-up signals is set to the special value or is greater than the quantity of content field groups, as described herein.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station, a multiple UE (multi-UE) wake-up signal in a downlink control information (DCI) communication based at least in part on a bitmap scheme associated with a set of wake-up indicator fields included in the DCI communication, the DCI communication further including a set of content field groups;
   identifying a content field group of the set of content field groups that is to be read by the UE; and
   determining, based at least in part on the identified content field group, a behavior associated with performing a UE wake-up operation.

2. The method of claim 1, wherein the content field group includes information associated with at least one of:
   a bandwidth part associated with performing the UE wake-up operation;
   a channel state information (CSI) request associated with performing the UE wake-up operation; or
   a primary cell or secondary cell indication associated with performing the UE wake-up operation.

3. The method of claim 1, wherein the DCI communication includes one or more padding bits.

4. The method of claim 1, wherein the DCI communication includes a set of cyclic redundancy check (CRC) bits that is scrambled by a wake-up radio network temporary identifier (RNTI).

5. The method of claim 1, wherein identifying the content field group comprises:
identifying the content field group based at least in part on information included in a set of wake-up indicator fields included in the DCI communication.

6. The method of claim 5, wherein the information included in the set of wake-up indicator fields is a number of occurrences of a particular value in a portion of the set of wake-up indicator fields that precedes a portion of the set of wake-up indicator fields corresponding to the multi-UE wake-up signal.

7. The method of claim 1, wherein identifying the content field group comprises:
identifying the content field group based at least in part on a field group index that is configured on the UE.

8. The method of claim 1, wherein the behavior indicates that the UE is to transmit a channel state information (CSI) report, and wherein the method further comprises:
identifying a set of resources in which to transmit the CSI report; and
transmitting the CSI report in the set of resources.

9. The method of claim 8, wherein identifying the set of resources comprises identifying the set of resources based at least in part on at least one of:
a radio resource control (RRC) configuration;
a configured grant;
a default configuration; or
a partial grant included in the DCI communication.

10. The method of claim 1, further comprising:
determining a wake-up radio network temporary identifier (RNTI) associated with the UE,
wherein the wake-up RNTI is determined based at least in part on:
another RNTI associated with the UE,
a cell identifier,
a cell group identifier, or
a bandwidth part identifier; and
receiving the DCI communication based at least in part on the wake-up RNTI.

11. The method of claim 10, wherein the wake-up RNTI is a cell group-level wake-up RNTI.

12. The method of claim 1, wherein at least one of:
the UE wake-up operation includes enabling monitoring of a physical downlink control channel (PDCCH) in association with receiving or transmitting a communication in an upcoming discontinuous reception (DRX) cycle on-duration, or
the behavior includes monitoring a particular bandwidth part or transmitting a channel state information (CSI) report.

13. A user equipment (UE), comprising:
one or more memories; and
one or more processors coupled to the one or more memories, configured to:
receive, from a base station, a multiple UE (multi-UE) wake-up signal in a downlink control information (DCI) communication based at least in part on a bitmap scheme associated with a set of wake-up indicator fields included in the DCI communication, the DCI communication further including a set of content field groups;
identify a content field group of the set of content field groups that is to be read by the UE; and
determine, based at least in part on the identified content field group, a behavior associated with performing a UE wake-up operation.

14. The UE of claim 13, wherein the content field group includes information associated with at least one of:
a bandwidth part associated with performing the UE wake-up operation;
a channel state information (CSI) request associated with performing the UE wake-up operation; or
a primary cell or secondary cell indication associated with performing the UE wake-up operation.

15. The UE of claim 13, wherein the DCI communication includes one or more padding bits.

16. The UE of claim 13, wherein the DCI communication includes a set of cyclic redundancy check (CRC) bits that is scrambled by a wake-up radio network temporary identifier (RNTI).

17. A non-transitory computer-readable medium storing a set of instructions for wireless communication, the set of instructions comprising:
one or more instructions that, when executed by one or more processors of a user equipment (UE), cause the UE to:
receive, from a base station, a multiple UE (multi-UE) wake-up signal in a downlink control information (DCI) communication based at least in part on a bitmap scheme associated with a set of wake-up indicator fields included in the DCI communication, the DCI communication further including a set of content field groups;
identify a content field group of the set of content field groups that is to be read by the UE; and
determine, based at least in part on the identified content field group, a behavior associated with performing a UE wake-up operation.

18. The non-transitory computer-readable medium of claim 17, wherein the content field group includes information associated with at least one of:
a bandwidth part associated with performing the UE wake-up operation;
a channel state information (CSI) request associated with performing the UE wake-up operation; or
a primary cell or secondary cell indication associated with performing the UE wake-up operation.

19. The non-transitory computer-readable medium of claim 17, wherein the DCI communication includes one or more padding bits, or wherein the DCI communication includes a set of cyclic redundancy check (CRC) bits that is scrambled by a wake-up radio network temporary identifier (RNTI).

20. The non-transitory computer-readable medium of claim 17, wherein identifying the content field group comprises:
identifying the content field group based at least in part on a field group index that is configured on the UE.

21. The non-transitory computer-readable medium of claim 17, wherein the one or more instructions further cause the UE to:
determine a wake-up radio network temporary identifier (RNTI) associated with the UE,
wherein the wake-up RNTI is determined based at least in part on:
another RNTI associated with the UE,
a cell identifier,
a cell group identifier, or a bandwidth part identifier; and
receive the DCI communication based at least in part on the wake-up RNTI.

22. An apparatus for wireless communication, comprising:
means for receiving, from a base station, a multiple UE (multi-UE) wake-up signal in a downlink control information (DCI) communication based at least in part on a bitmap scheme associated with a set of wake-up indicator fields included in the DCI communication, the DCI communication further including a set of content field groups;
means for identifying a content field group of the set of content field groups that is to be read by the UE; and
means for determining, based at least in part on the identified content field group, a behavior associated with performing a UE wake-up operation.

23. The apparatus of claim 22, wherein the content field group includes information associated with at least one of:
a bandwidth part associated with performing the UE wake-up operation;
a channel state information (CSI) request associated with performing the UE wake-up operation; or
a primary cell or secondary cell indication associated with performing the UE wake-up operation.

24. The apparatus of claim 22, wherein the DCI communication includes one or more padding bits, or wherein the DCI communication includes a set of cyclic redundancy check (CRC) bits that is scrambled by a wake-up radio network temporary identifier (RNTI).

25. The UE of claim 13, wherein the one or more processors are further configured to:
determine a wake-up radio network temporary identifier (RNTI) associated with the UE,
wherein the wake-up RNTI is determined based at least in part on:
another RNTI associated with the UE,
a cell identifier,
a cell group identifier, or
a bandwidth part identifier; and
receive the DCI communication based at least in part on the wake-up RNTI.

26. The UE of claim 13, wherein the UE wake-up operation includes enabling monitoring of a physical downlink control channel (PDCCH) in association with receiving or transmitting a communication in an upcoming discontinuous reception (DRX) cycle on-duration.

27. The non-transitory computer-readable medium of claim 17, wherein the UE wake-up operation includes enabling monitoring of a physical downlink control channel (PDCCH) in association with receiving or transmitting a communication in an upcoming discontinuous reception (DRX) cycle on-duration.

28. The apparatus of claim 22, wherein the UE wake-up operation includes enabling monitoring of a physical downlink control channel (PDCCH) in association with receiving or transmitting a communication in an upcoming discontinuous reception (DRX) cycle on-duration.

* * * * *